(12) United States Patent
Pickens et al.

(10) Patent No.: US 9,419,258 B2
(45) Date of Patent: *Aug. 16, 2016

(54) ADAPTIVE BATTERY PACK-TO-UNIVERSAL SERIAL BUS POWER DEVICES

(71) Applicant: Custom LeatherCraft Manufacturing Co., Inc., South Gate, CA (US)

(72) Inventors: Ron A. Pickens, Owasso, OK (US); Matthew D. Noble, Los Angeles, CA (US)

(73) Assignee: Custom LeatherCraft Manuf. Co., Inc., South Gate, CA (US)

( * ) Notice: Subject to any disclaimer, the term of this patent is extended or adjusted under 35 U.S.C. 154(b) by 50 days.

This patent is subject to a terminal disclaimer.

(21) Appl. No.: 14/494,739

(22) Filed: Sep. 24, 2014

(65) Prior Publication Data

US 2015/0084596 A1    Mar. 26, 2015

Related U.S. Application Data

(60) Provisional application No. 61/882,045, filed on Sep. 25, 2013, provisional application No. 61/882,053, filed on Sep. 25, 2013.

(51) Int. Cl.
| | |
|---|---|
| *H01M 10/46* | (2006.01) |
| *H01M 2/10* | (2006.01) |
| *A45C 11/00* | (2006.01) |
| *A45F 5/02* | (2006.01) |
| *A45C 13/02* | (2006.01) |
| *A45C 15/00* | (2006.01) |
| *H02J 7/00* | (2006.01) |

(52) U.S. Cl.
CPC ............ *H01M 2/1022* (2013.01); *A45C 11/00* (2013.01); *A45C 13/02* (2013.01); *A45C 15/00* (2013.01); *A45F 5/021* (2013.01); *A45F 5/022* (2013.01); *H02J 7/0044* (2013.01); *A45C 2011/002* (2013.01); *A45C 2013/026* (2013.01); *H01M 2220/30* (2013.01)

(58) Field of Classification Search
CPC ............................... H02J 7/0042; H02J 7/355
USPC ................. 320/103, 107, 110, 111, 114, 115
See application file for complete search history.

(56) References Cited

U.S. PATENT DOCUMENTS

| | | | | |
|---|---|---|---|---|
| 5,280,229 A | * | 1/1994 | Faude | H02J 7/0045 320/110 |
| 2014/0327401 A1 | * | 11/2014 | Pickens | H02J 7/0042 320/127 |
| 2015/0084578 A1 | * | 3/2015 | Pickens | H02J 7/0054 320/103 |
| 2015/0084592 A1 | * | 3/2015 | Pickens | H02J 7/0045 320/112 |
| 2015/0084596 A1 | * | 3/2015 | Pickens | A45F 5/021 320/127 |
| 2015/0262117 A1 | * | 9/2015 | Li | G06Q 10/087 235/385 |
| 2015/0318716 A1 | * | 11/2015 | Pickens | H02J 7/0003 320/110 |

* cited by examiner

*Primary Examiner* — Edward Tso

(57) ABSTRACT

A device includes a battery pack receptacle that removably connects to a particular adapter of multiple adapters for a particular associated battery pack that is used for a cordless device. A universal serial bus (USB) port is connected to the battery pack receptacle. The battery pack is used as a power source for the USB port.

20 Claims, 34 Drawing Sheets

ADAPTIVE BATTERY PACK-TO-UNIVERSAL SERIAL BUS POWER DEVICES

CROSS-REFERENCE TO RELATED APPLICATIONS

This application claims the priority benefit of U.S. Provisional Patent Application Ser. No. 61/882,045, filed Sep. 25, 2013, and U.S. Provisional Patent Application Ser. No. 61/882,053, filed Sep. 25, 2013, both incorporated herein by reference in their entirety.

TECHNICAL FIELD

One or more embodiments relate generally to universal serial bus (USB) power, and in particular, use of interchangeable battery pack adapters for portable tool battery packs and a battery pack adapter/receptacle as a power source for USB devices.

BACKGROUND

Portable cordless power tools typically include replaceable and removable battery packs. The battery packs may have different voltages, such as 12V, 18V, 24V, etc. The cordless power tools (e.g., a cordless drill, cordless screwdriver, etc.) may be packaged with a spare battery pack that may be charged in a charger while the other battery pack is in use. Different brands of cordless power tools typically each have their own type of battery pack that is electrically and physically configured such that different brand battery packs cannot be used for other brands of cordless power tools and the respective battery pack chargers.

SUMMARY

One embodiment includes a battery pack receptacle that removably connects to a particular adapter of multiple adapters for a particular associated battery pack that is used for a cordless device. A universal serial bus (USB) port is connected to the battery pack receptacle. The battery pack is used as a power source for the USB port.

Another embodiment comprises a system that includes a utility bag and a battery pack receptacle. A plurality of battery pack adapters are each configured for coupling to the battery pack receptacle. Each of the plurality of battery pack adapters is configured for removably coupling with a particular type of battery pack used for a cordless device. An attachment device coupled to the battery pack receptacle that attaches the battery pack receptacle to the utility bag. At least one USB port is coupled to the battery pack receptacle. The battery pack receptacle transfers power from a received particular battery pack through a particular one of the plurality of battery pack adapters and to the USB port.

Yet another embodiment comprises a system that includes a plurality of cordless device battery pack adapters. A battery pack receptacle removably couples to one of the plurality of cordless device battery pack adapters for a particular cordless device battery pack. The battery pack receptacle comprises a USB port. Each cordless device battery pack adapter of the plurality of cordless device battery pack adapters is configured with a different electrical contact configuration from one another for electrically connecting to a particular type of cordless device battery pack. Each cordless device battery pack adapter of the plurality of cordless device battery pack adapters is configured with a same electrical contact configuration for electrically connecting to the battery pack receptacle. The USB port is powered by a battery pack connected with a particular one of the plurality of cordless device battery pack adapters that is coupled to the battery pack receptacle.

BRIEF DESCRIPTION OF THE DRAWINGS

The embodiments are illustrated by way of example, and not by way of limitation, in the Figures of the accompanying drawings and in which like reference numerals refer to similar elements and in which.

DETAILED DESCRIPTION

Figure 1:
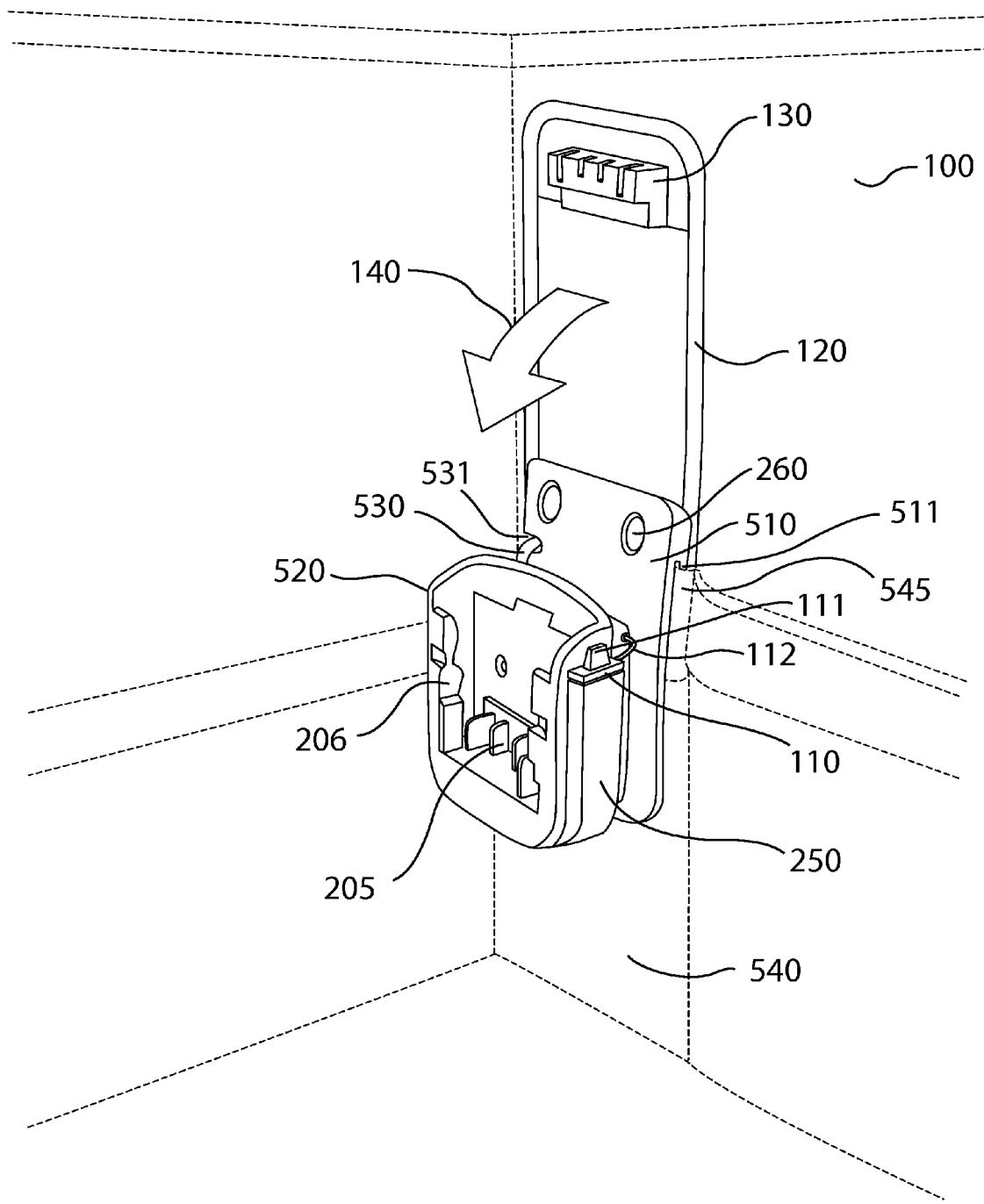
FIG. 1 illustrates a perspective view of a receptacle/adapter for a battery pack with a protection component in an unprotected state showing an example implementation with a utility bag according to one embodiment.

The following description is made for the purpose of illustrating the general principles of the one or more embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

The description may disclose several preferred embodiments for use of interchangeable battery pack adapters for different portable tool battery packs having different electrical connection configurations and a battery pack adapter/receptacle for transferring power from any one of multiple cordless device battery packs to a USB port and/or a USB receptacle for a housing, stand-alone, bag apparatus, holding apparatus, etc., as well as operation and/or component parts thereof. While the following description will be described in terms of adaptive cordless device battery pack power for USB devices, for clarity and to place the one or more embodiments in context, it should be kept in mind that the teachings herein may have broad application to all types of systems, devices and applications.

The description may disclose several preferred embodiments of adaptive battery pack to USB connections for powering/charging electronic devices, as well as operation and/or component parts thereof. While the following description will be described in terms of adaptive battery pack to USB connections for powering/charging electronic devices and systems for clarity and to place the invention in context, it should be kept in mind that the teachings herein may have broad application to all types of systems, devices and applications.

One or more embodiments relate to cordless device battery pack power used for USB devices. In one embodiment, an apparatus includes an adaptive battery pack receptacle that removably connects to one of multiple different (e.g., different electrical contact configurations) adapters for one of multiple different battery packs used for a cordless power tool device. One or more USB ports or connectors (e.g., 1, 2, 3, 4, etc.) are coupled to the battery pack receptacle. A battery pack inserted into an adapter that is inserted into the battery pack receptacle/adapter is used as a power source for the one or more USB ports. An attachment device may be connected to the battery pack receptacle for optionally attaching the battery pack receptacle/adapter to an item or housing, such as a utility bag, bag apparatus, a belt, a holster, a pocket, a ladder, suspenders, a safety harness, a platform, a table, etc.

One embodiment includes a battery pack receptacle that removably connects to a particular adapter of multiple adapters for a particular associated battery pack that is used for a cordless device. A universal serial bus (USB) port is connected to the battery pack receptacle. The battery pack is used as a power source for the USB port.

Another embodiment comprises a system that includes a utility bag and a battery pack receptacle. A plurality of battery pack adapters are each configured for coupling to the battery pack receptacle. Each of the plurality of battery pack adapters is configured for removably coupling with a particular type of battery pack used for a cordless device. An attachment device coupled to the battery pack receptacle that attaches the battery pack receptacle to the utility bag. At least one USB port is coupled to the battery pack receptacle. The battery pack receptacle transfers power from a received particular battery pack through a particular one of the plurality of battery pack adapters and to the USB port.

Yet another embodiment comprises a system that includes a plurality of cordless device battery pack adapters. A battery pack receptacle removably couples to one of the plurality of cordless device battery pack adapters for a particular cordless device battery pack. The battery pack receptacle comprises a USB port. Each cordless device battery pack adapter of the plurality of cordless device battery pack adapters is configured with a different electrical contact configuration from one another for electrically connecting to a particular type of cordless device battery pack. Each cordless device battery pack adapter of the plurality of cordless device battery pack adapters is configured with a same electrical contact configuration for electrically connecting to the battery pack receptacle. The USB port is powered by a battery pack connected with a particular one of the plurality of cordless device battery pack adapters that is coupled to the battery pack receptacle.

One embodiment includes charging/powering an electronic device that may be employed in multiple housings or bag apparatus, such as utility bags, fishing bags, backpacks, duffel bags, tool boxes, tool carriers, sports bags, luggage, emergency services bags, cases, coolers, luggage, tackle boxes, carrying boxes/bags, etc. It should be noted that while utility bags are shown and discussed for housing the embodiments, other housings may also be implemented and may be considered as a utility bag, such as: pocket books, fanny packs, stand-alone containers or devices, bucket bags, fishing bags, backpacks, duffel bags, tool boxes, tool carriers, sports bags, luggage, emergency services bags, cases, coolers, luggage, tackle boxes, carrying boxes/bags, vehicle consoles, etc.). In other embodiments, no housing is required and the battery pack adapter/receptacle and USB receptacle or port may be integrated into a single component or housing without a utility bag or other container, be used for attaching to other items, placed stand-alone on a platform, table or other surface, etc.

FIG. 1 illustrates a perspective view 100 of a battery pack receptacle/adapter 520 for a cordless device battery pack with a protection component 120 in an unprotected state showing an example implementation with a utility bag 540 according to one embodiment. In one embodiment, the protection component 120 includes a battery connector terminal protection component 130 that may be placed over/onto the battery connectors terminals 205. In one embodiment, the protection component is a flap or cover that covers the battery terminal connectors for protection. In other embodiments, the protection component 120 may not include the battery connector terminal protection component 130. In one embodiment, the protection component may comprise of a solid cover, a removable cover, etc. for protecting the battery terminal connectors 205 from damage (e.g., inserting a tool or item into a utility bag). In one embodiment, the protection component 120 may be moved in the direction of the arrow 140 to protect the battery terminal connectors 205 and the battery pack battery pack receptacle/adapter 520 components. In one embodiment, the battery connector terminal protection component 130 may be made of rubber, plastic, gel, etc.

In one embodiment, the battery pack battery pack receptacle/adapter 520 may include one or more (e.g., 1, 2, 3, 4, etc.) USB connection ports 250. In one embodiment, the battery pack battery pack receptacle/adapter 520 includes a USB cord 530 having a length and including a USB port at the end (e.g., male or female). In one embodiment, the length of the USB cord 530 may comprise any desirable length and may be based on implementation (e.g., 6 in.-6 ft., etc.). In one embodiment, the receptacle/adapter may have more than one USB connection ports 250 that are integrated with the battery pack battery pack receptacle/adapter 520.

In one embodiment, the battery pack battery pack receptacle/adapter 520 includes a USB port protection element 110 that may be placed into the USB port 250 to protect the USB port 250 from damage from other items, elements (e.g., sand, dirt, liquids, etc.). In one embodiment, the protection element 110 includes a grasping element 111. In one embodiment, the protection element 110 may include an attachment component 112, such as a cord, metal, rubber, plastic, etc. for attaching the protection element to the battery pack battery pack receptacle/adapter 520.

In one embodiment, the battery pack battery pack receptacle/adapter 520 may include attachment portions 260 for either permanently or removably attaching the receptacle/adapter to a utility bag 540 or other device. In one embodiment, the battery pack battery pack receptacle/adapter 520 includes a channel or cut-out portion 531 for passing the cord 530 through a front coupling portion 510.

In one embodiment, the battery pack receptacle/adapter 520 includes a rear coupling portion 511. In one embodiment, a gap between the front coupling portion 510 and the rear coupling portion 511 is fitted over material of a pocket 545 of the utility bag 540 for placement of the battery pack receptacle/adapter 520.

In one embodiment, the USB cord 530 may be fitted into a conduit, tunnel, groove, etc. of utility bags, bags, cases, boxes, coolers, etc.

In one embodiment, the battery pack receptacle/adapter 520 may be positioned in a pocket, clipped to a pocket, part of a pocket, positioned inside a utility bag, part of a wall of a utility bag (e.g., a side-wall, an end-wall, etc.), container, case, box, cooler, etc. as desired.

Figure 2:
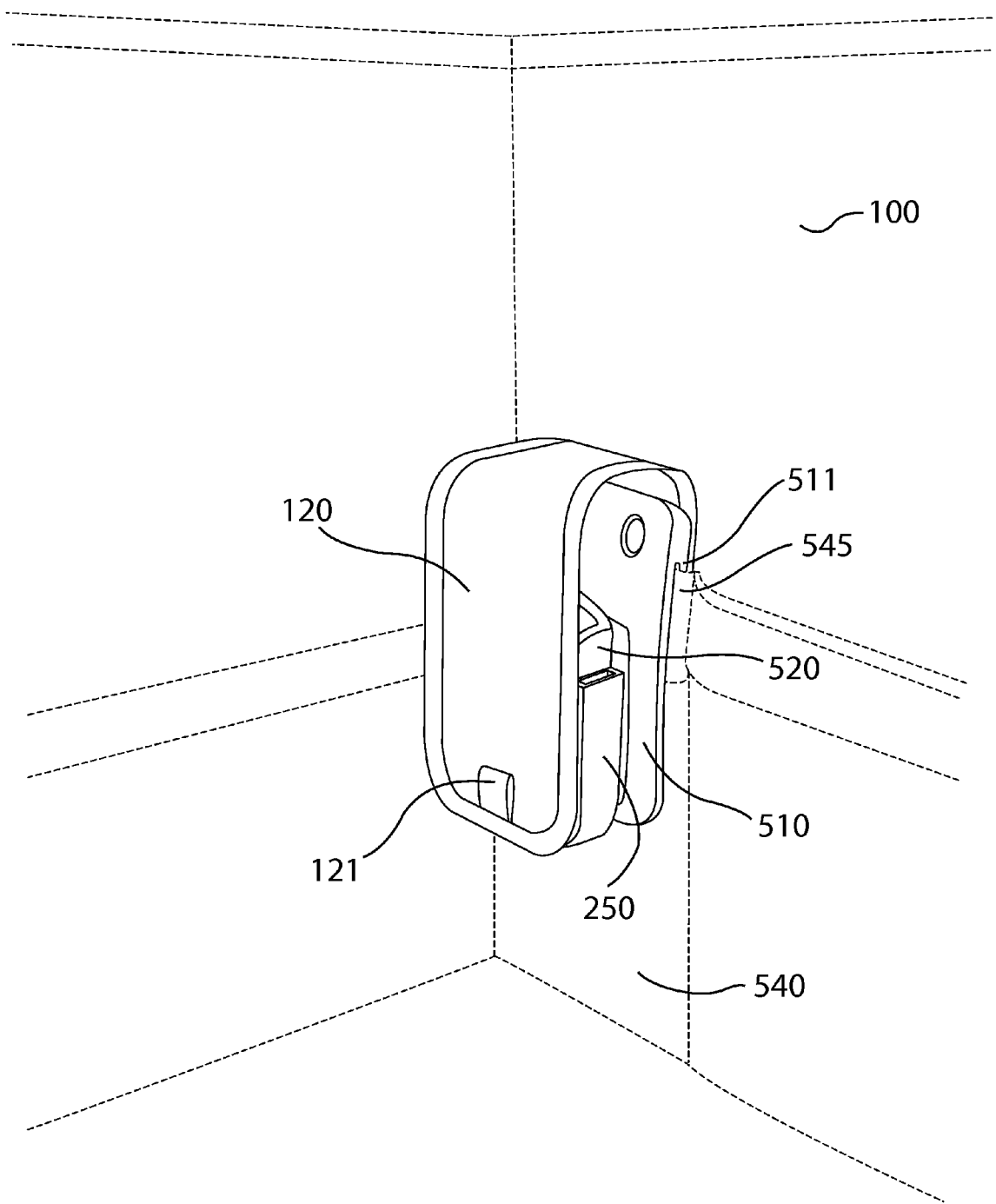
FIG. 2 illustrates a perspective view of an receptacle/adapter for a battery pack with a protection component in a protected state showing an example implementation with a utility bag according to one embodiment.

FIG. 2 illustrates a perspective view 100 of a battery pack receptacle/adapter 520 for a battery pack with a protection component 120 in a protected state showing an example implementation with a utility bag 540 according to one embodiment. In one embodiment, the protection component includes a handle 121. In one embodiment, the handle 121 may include hook and loop fasteners for coupling to a wall of the utility bag 540. In other embodiments, the protection component includes the battery connector terminal protection component 130 and the handle 121 makes it easier for a user to pull up on the protection component 120 and disengage the battery connector terminal protection component 130 from the battery connector terminals 205.

Figure 3:
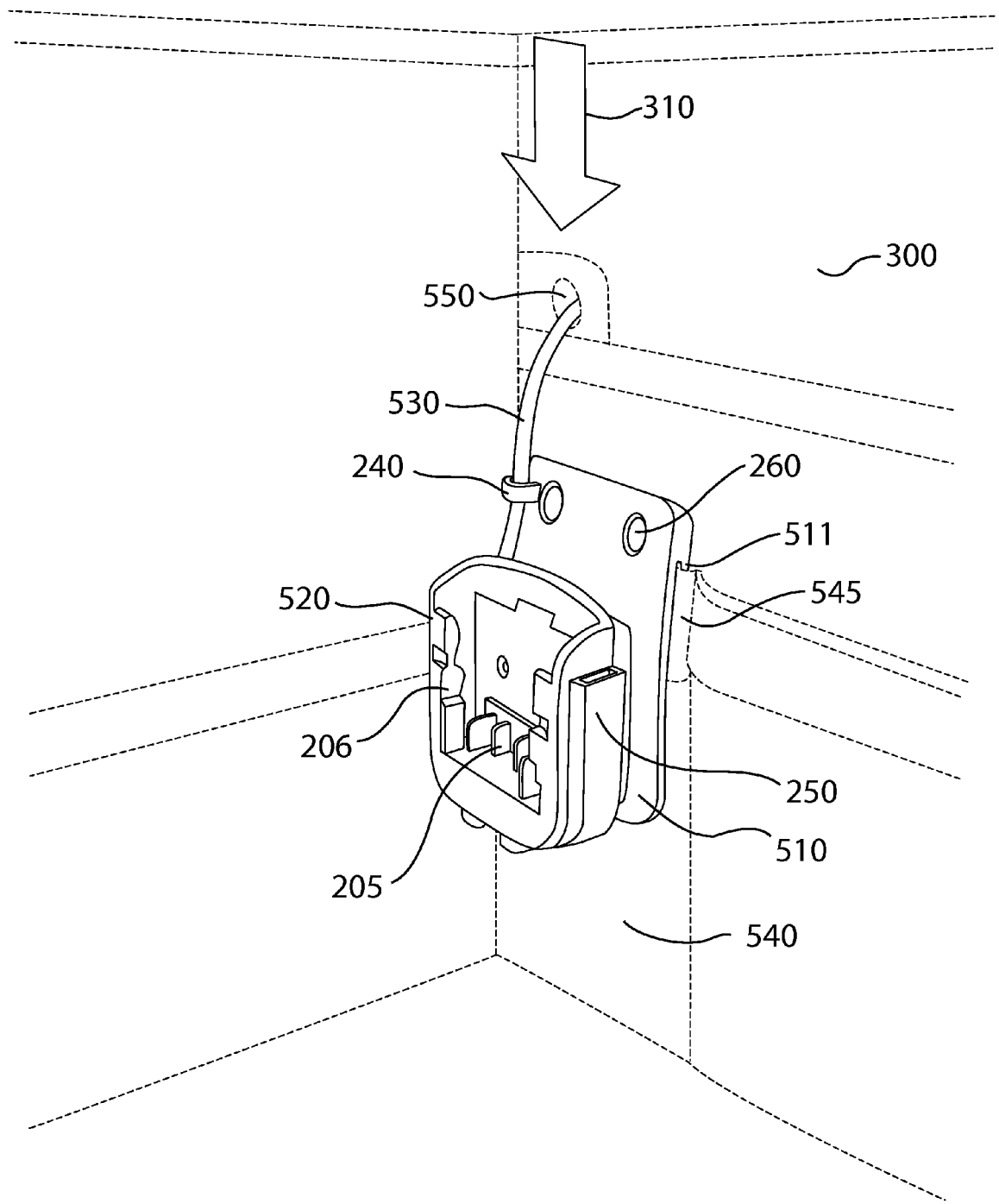
FIG. 3 illustrates a perspective view of another receptacle/adapter for a battery pack showing an example implementation with a utility bag according to one embodiment.

FIG. 3 illustrates a perspective view 300 of another battery pack receptacle/adapter 520 for a battery pack showing an example implementation with a utility bag 540 according to one embodiment. In one embodiment, the battery pack receptacle/adapter 520 does not include the protection component 120. In one embodiment, the battery pack receptacle/adapter 520 includes a USB cord guide element 240 (e.g., a loop, open loop, removable portion of a loop, etc.) that may be placed around or over the USB cord 530 for maintaining the USB cord 530 in a desired position. In one embodiment, the USB cord 530 may be placed through a through-hole 550 of the example utility bag 540.

Figure 4:
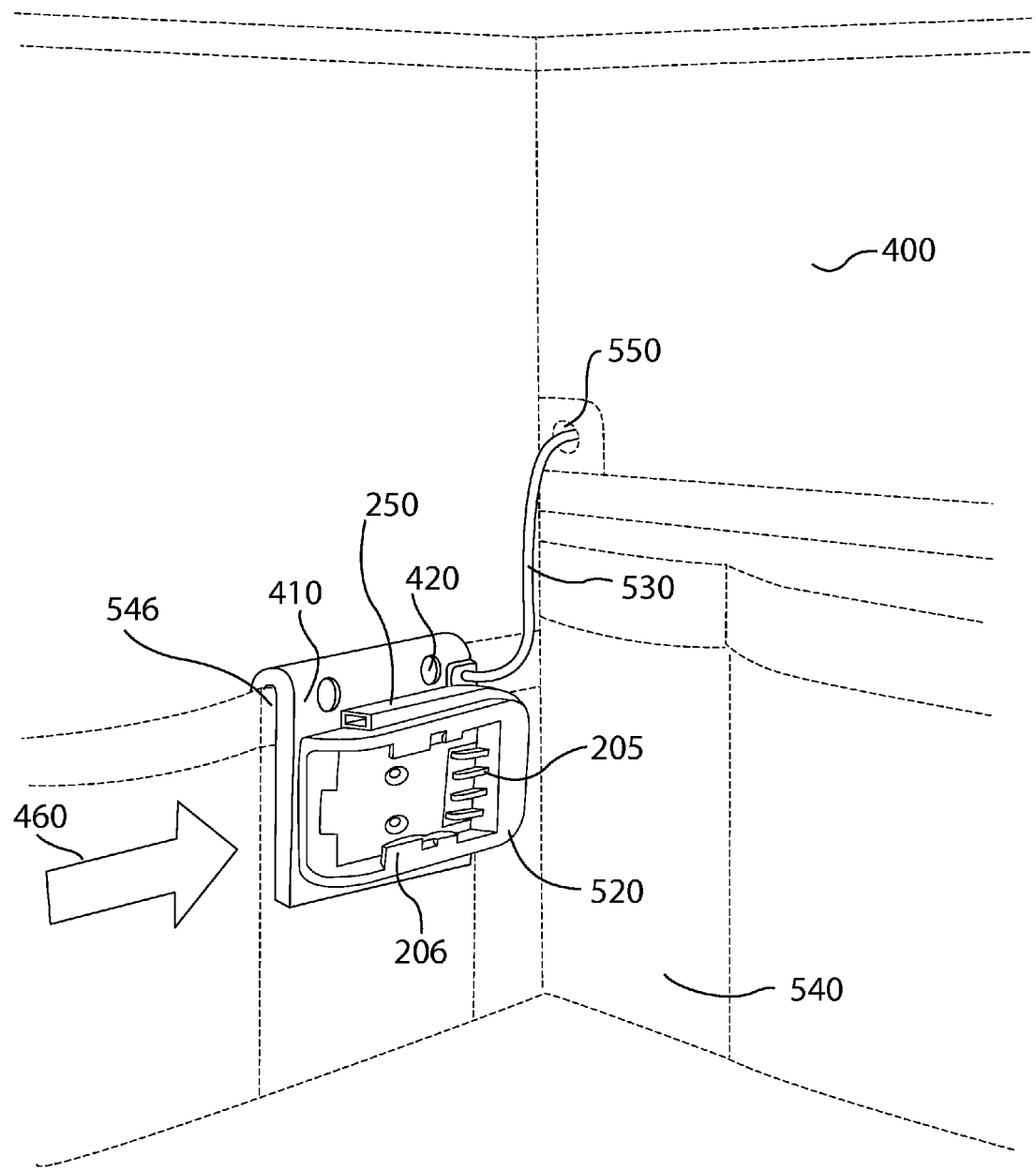
FIG. 4 illustrates a perspective view of yet another receptacle/adapter for a battery pack showing an example implementation with a utility bag according to one embodiment.

FIG. 4 illustrates a perspective view 400 of yet another battery pack receptacle/adapter 520 for a battery pack showing an example implementation with a utility bag 540 according to one embodiment. In one embodiment, the battery pack receptacle/adapter 520 may be mounted horizontally on a pocket 546 or material that provides for placement of the attachment mounting element 410. In one embodiment, the battery pack receptacle/adapter 520 is fixed to the attachment mounting element 410. In one embodiment, a battery pack slides or clips into place on the battery pack receptacle/adapter 520 in the direction of the arrow 460. In one embodiment, the battery pack receptacle/adapter 520 may be removably coupled to the pocket 546 or permanently positioned on the utility bag 540 (or other device) using the through-hole 420 and fastening (e.g., using known fastening means, such as rivets, bolts/screws, snaps, etc.). In one embodiment, the battery pack receptacle/adapter 520 may be fastened to the utility bag 540 (or other device) using hook and loop fasteners.

Figure 5:
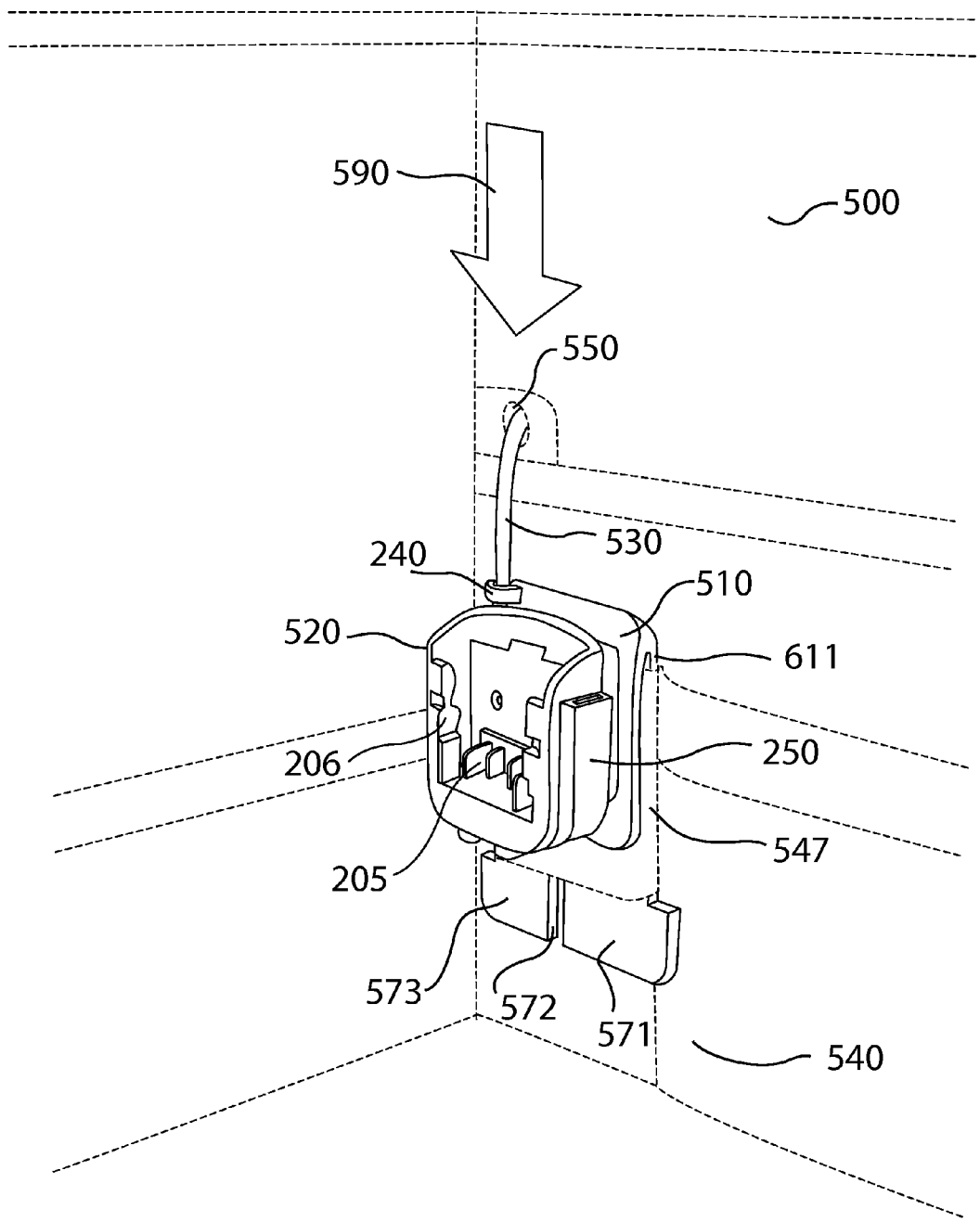
FIG. 5 illustrates a perspective view of still another receptacle/adapter for a battery pack showing an example implementation with a utility bag according to one embodiment.

FIG. 5 illustrates a perspective view 500 of still another battery pack receptacle/adapter 520 for a battery pack showing an example implementation with a utility bag 540 (or other device) according to one embodiment. In one embodiment, the battery pack receptacle/adapter 520 includes a front coupling portion 510, a rear coupling portion 611, a first foot portion 571, and a second foot portion 573, where a gap or groove 572 is formed between the first foot portion 571 and the second foot portion 573. In one embodiment, the foot portions 571 and 573 may be forced towards one another (each towards the gap 572) such that the width of the lower rear coupling portion 611 fits within the material 547 when inserted and expands back after the forced is removed, which creates a locking or fastening of the foot portions 571 and 573 outside the width of the material 547 and prevents removal unless the foot portions 571 and 573 are forced towards each other and the battery pack receptacle/adapter 520 is forced out of the material 547 that overlaps a portion of the utility bag 540 (or other device). In one embodiment, the material 547 overlaps a portion of the utility bag 540 (or other device). In one embodiment, the battery pack receptacle/adapter 520 is removably coupled to the material 547. In one embodiment, a battery pack slides or clips into place on the battery pack receptacle/adapter 520 in the direction of the arrow 590. In one example, the material 547 forms a sleeve for holding the battery pack receptacle/adapter 520 using the foot portions 571 and 573, and the front coupling portion 510 and rear coupling portion 611.

In another example embodiment, the battery pack receptacle/adapter 520 may be permanently attached to a utility bag 540 (or other device), for example, using rivets, nuts and bolts, heat welding, epoxy welding, etc. In another example embodiment, the battery pack receptacle/adapter 520 may be mounted to material 547 internally or externally to the utility bag 540 (or other device).

Figure 6:
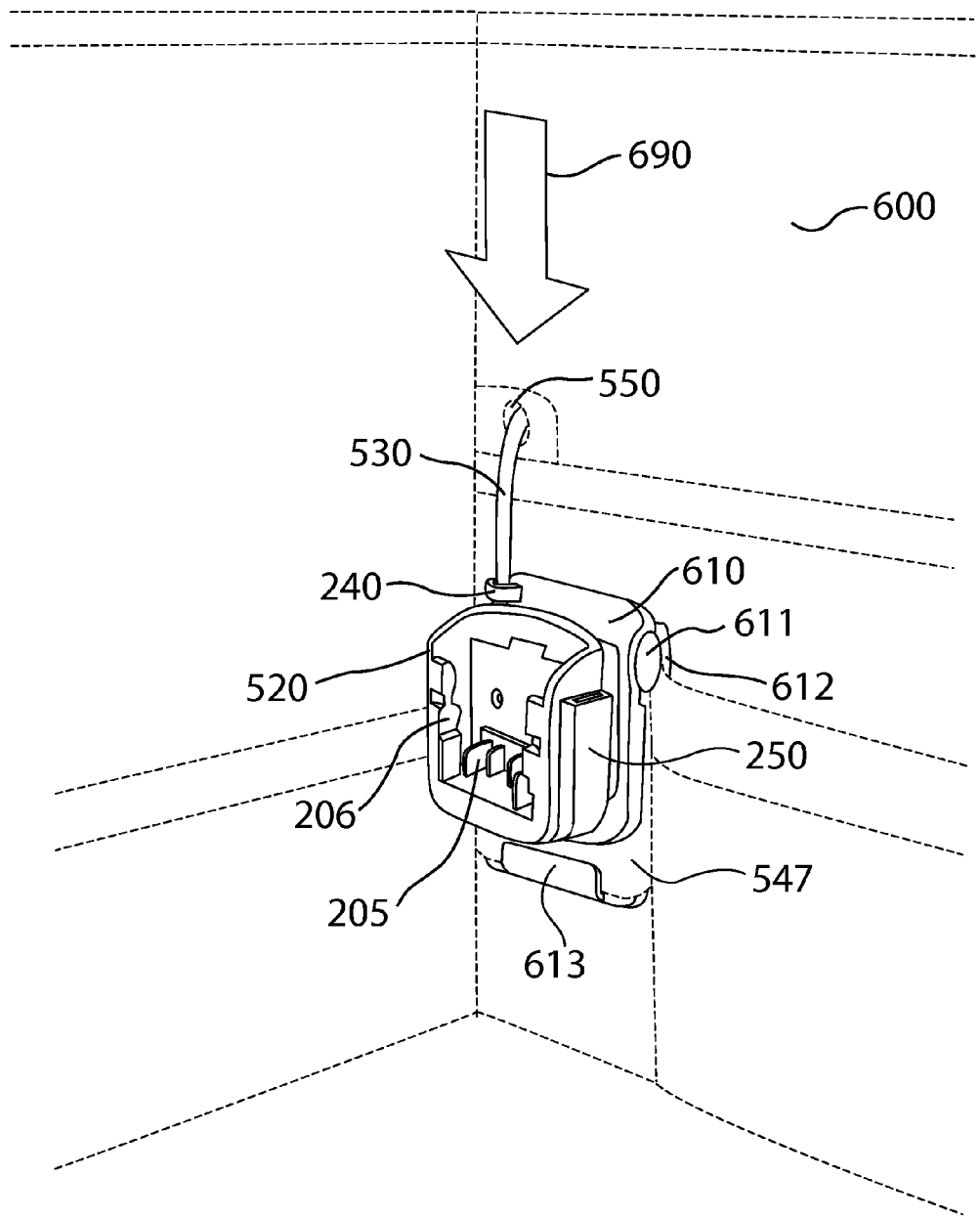
FIG. 6 illustrates a perspective view of another receptacle/adapter for a battery pack showing an example implementation with a utility bag according to one embodiment.

FIG. 6 illustrates a perspective view 600 of another battery pack receptacle/adapter 520 for a battery pack showing an example implementation with a utility bag 540 (or other device) according to one embodiment. In one embodiment, the battery pack receptacle/adapter 520 includes a front coupling portion 610, a rear coupling portion 612, a rotational element 611, and a retaining portion 613 coupled to the rear coupling portion 612. In one example, the retaining portion 613 is curved upward. In one embodiment, retaining portion 613 has material 547 of a utility bag 540 (or other device) fit within the material 547 when inserted, which creates a locking or fastening of the rear coupling portion 612 and prevents removal unless the front coupling portion 610 and rear coupling portion 612 are forced downward to release the material 547 from the retaining portion 613. In one embodiment, the material 547 overlaps a portion of the utility bag 540 (or other device). In one embodiment, the battery pack receptacle/adapter 520 is removably coupled to the material 547. In one embodiment, a battery pack slides or clips into place on the battery pack receptacle/adapter 520 in the direction of the arrow 690. In one embodiment, the front coupling portion 610, rotational element 611 and the rear coupling portion 612 form a spring clip type of device that may be pinched or grasped at the top to force the lower portion of the front coupling portion 610 and the lower portion of the rear coupling portion 612 apart, and released to force the lower portion of the front coupling portion 610 and the lower portion of the rear coupling portion 612 towards one another to clip to material, such as material 547.

In another example embodiment, the battery pack receptacle/adapter 520 may be permanently attached to a utility bag 540 (or other device), for example, using rivets, nuts and bolts, heat welding, epoxy welding, etc. In another example embodiment, the battery pack receptacle/adapter 520 may be mounted to material 547 internally or externally to the utility bag 540 (or other device).

Figure 7:
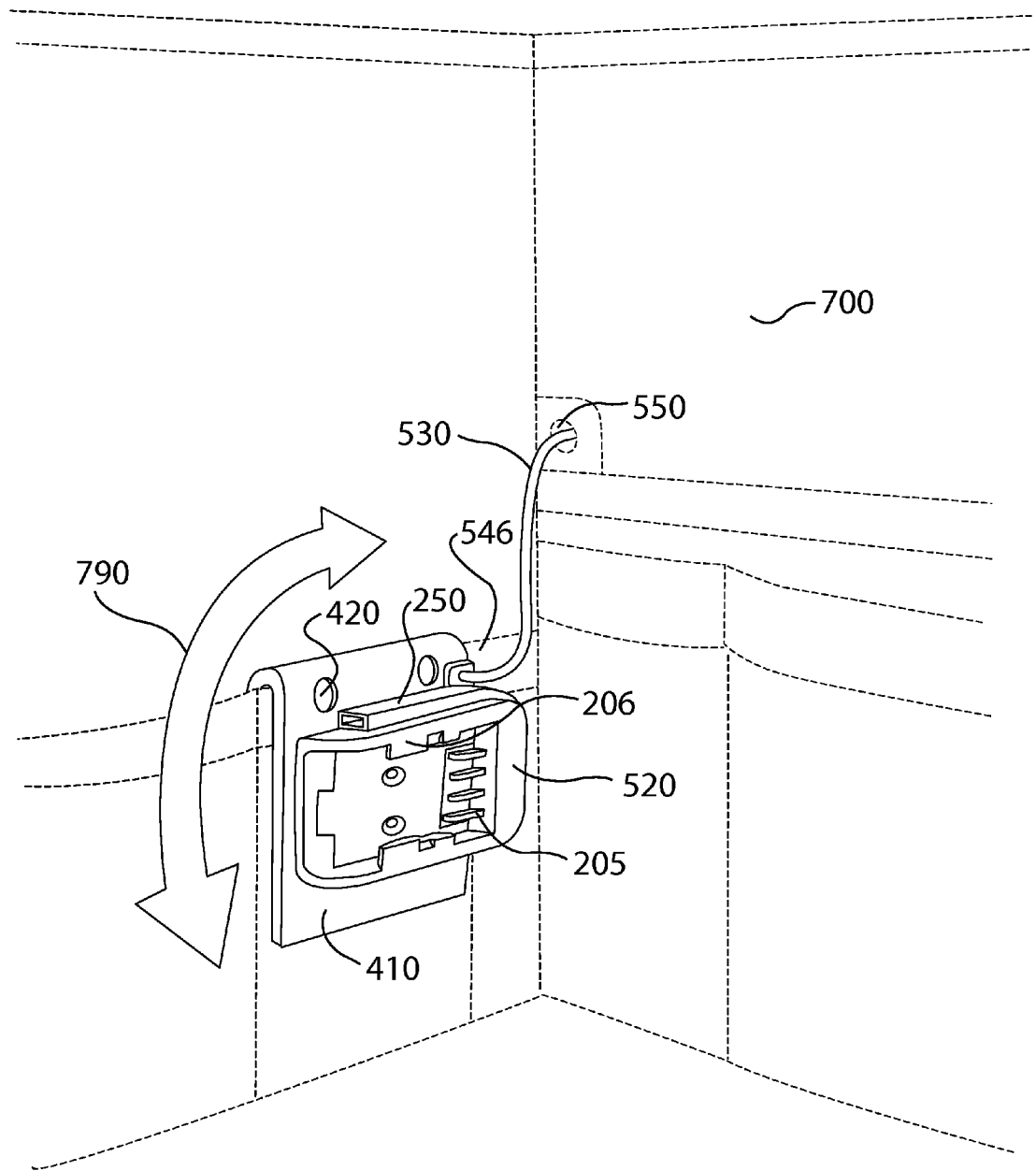
FIG. 7 illustrates a perspective view of a rotatable receptacle/adapter for a battery pack shown in a first orientation showing an example implementation with a utility bag according to one embodiment.

FIG. 7 illustrates a perspective view 700 of a rotatable battery pack receptacle/adapter 520 for a battery pack shown in a first orientation (e.g., horizontal) showing an example implementation with a utility bag or other device, according to one embodiment. In one embodiment, the battery pack receptacle/adapter 520 may be mounted horizontally on a pocket 546 or material that provides for placement of the attachment mounting element 410. In one embodiment, the battery pack receptacle/adapter 520 is rotatably mounted to the attachment mounting element 410 to provide for rotation in the direction of the arrows 790. In one embodiment, a battery pack slides or clips into place on the battery pack receptacle/adapter 520. In one embodiment, the battery pack receptacle/adapter 520 may be removably coupled to the pocket 546 or permanently positioned on the utility bag (or other device) using the through-hole 420 and fastening (e.g., using known fastening means, such as rivets, bolts/screws, snaps, etc.). In one embodiment, the battery pack receptacle/adapter 520 may be fastened to the utility bag (or other device) using hook and loop fasteners.

Figure 8:
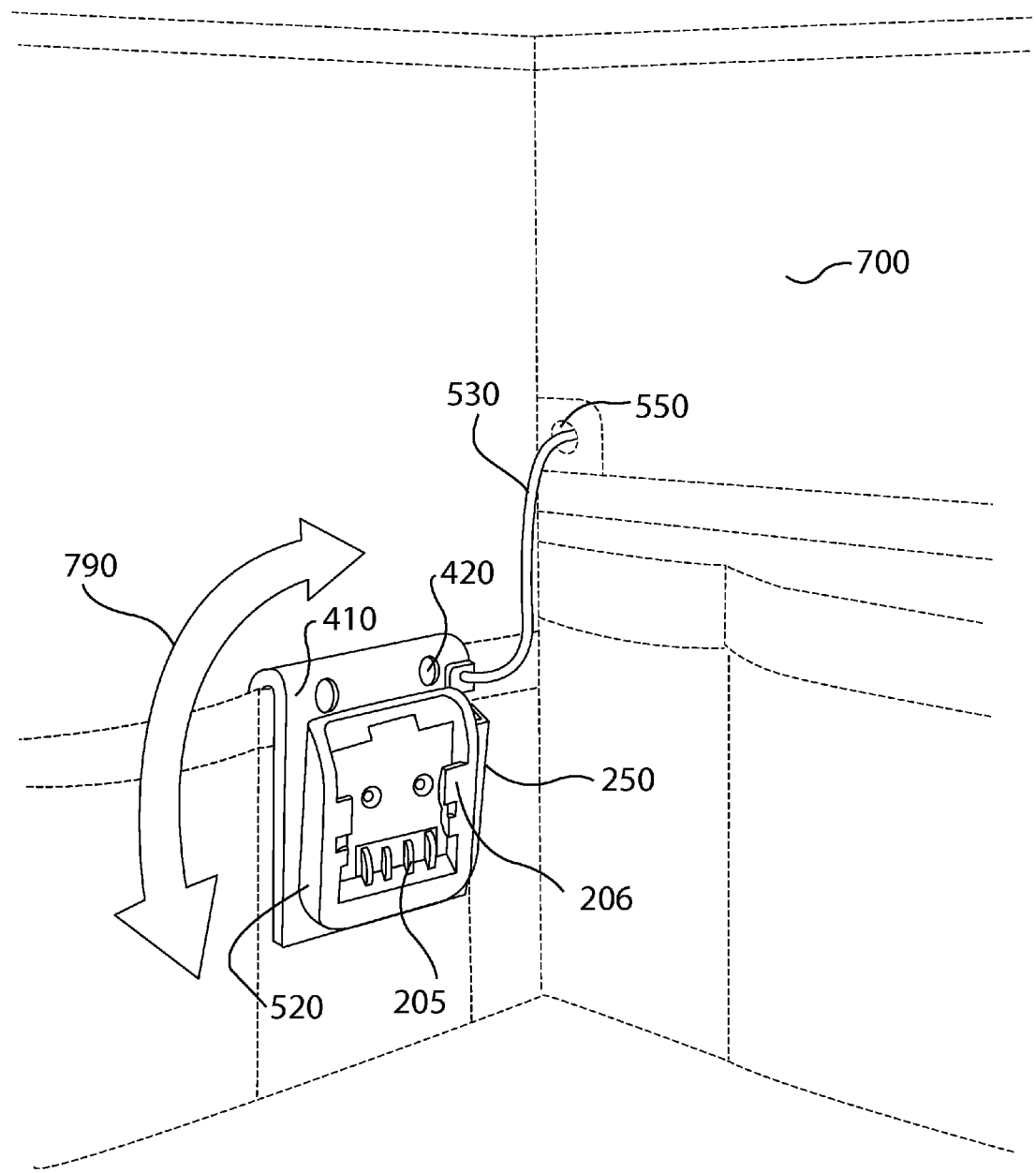
FIG. 8 illustrates a perspective view of a rotatable receptacle/adapter for a battery pack shown in a second orientation showing an example implementation with a utility bag according to one embodiment.

FIG. 8 illustrates a perspective view 700 of a rotatable battery pack receptacle/adapter 520 for a battery pack shown in a second orientation (e.g., vertical) showing an example implementation with a utility bag according to one embodiment. In one embodiment, the battery pack receptacle/adapter 520 may be mounted vertically on a pocket 546 or material that provides for placement of the attachment mounting element 410. In one embodiment, the battery pack receptacle/adapter 520 is rotatably mounted to the attachment mounting element 410 to provide for rotation in the direction of the arrows 790.

Figure 9:
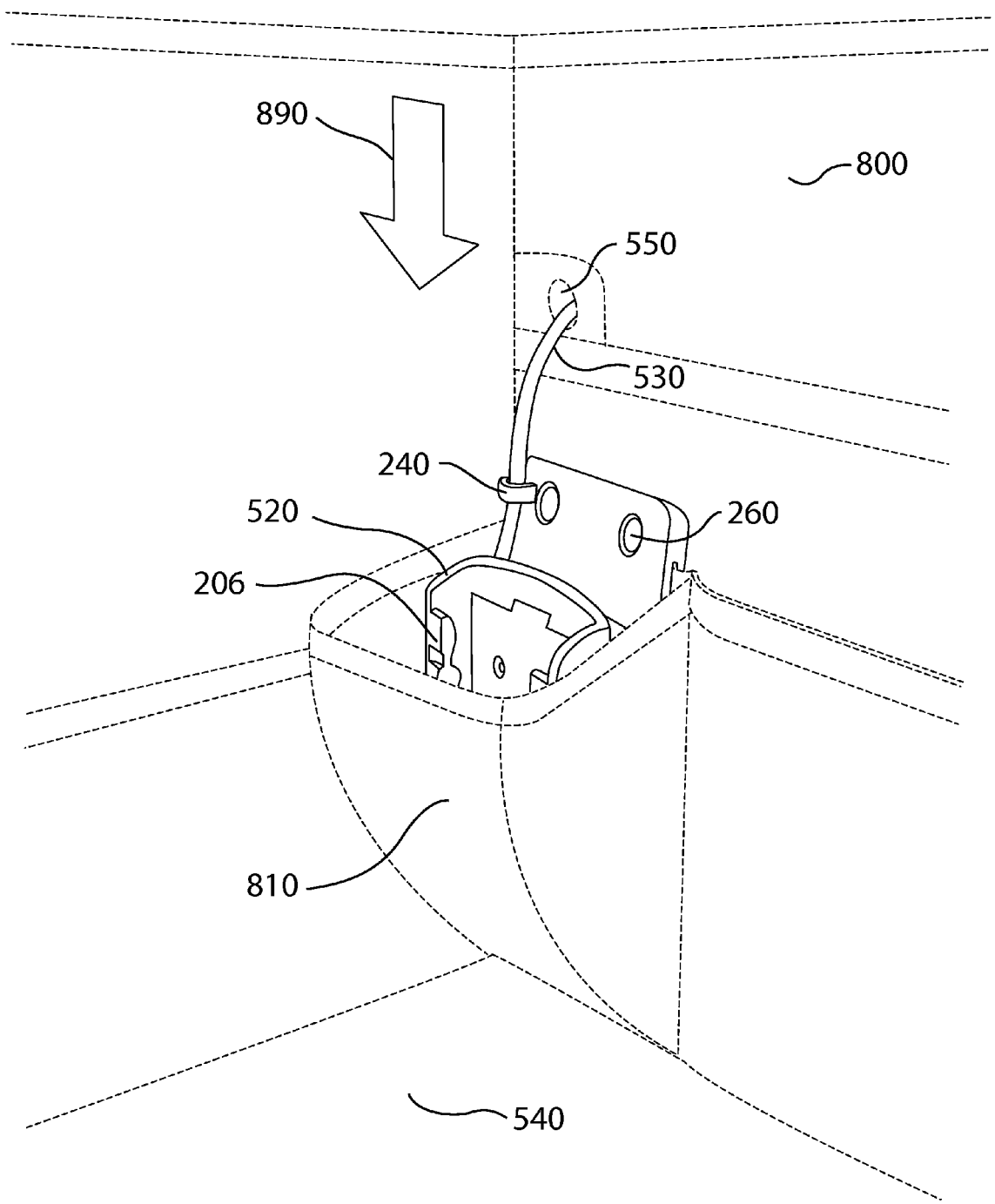
FIG. 9 illustrates a perspective view of an receptacle/adapter for a battery pack showing an example implementation with a utility bag according to one embodiment.

FIG. 9 illustrates a perspective view 800 of a battery pack receptacle/adapter 520 for a battery pack showing an example implementation with a utility bag 540 (or other device) according to one embodiment. In one embodiment, the battery pack receptacle/adapter 520 may be positioned into a pocket or compartment 810 that may be vertically or horizontally attached to the utility bag 540 (or other device). In one embodiment, a battery pack may be inserted into the battery pack receptacle/adapter 520 in the direction of the arrow 890.

Figure 10:
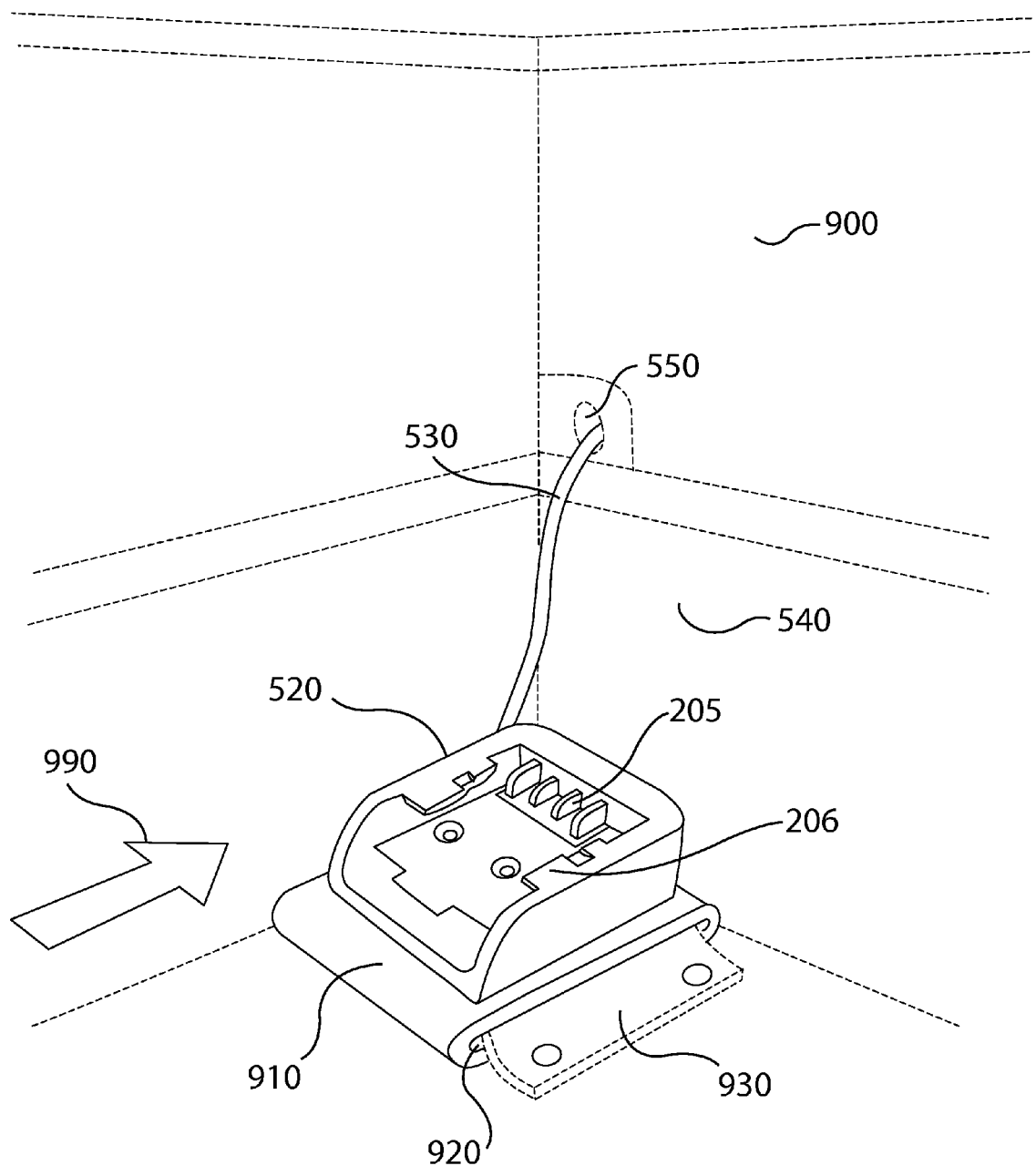
FIG. 10 illustrates a perspective view of another receptacle/adapter for a battery pack showing an example implementation with a utility bag according to one embodiment.

FIG. 10 illustrates a perspective view 900 of another battery pack receptacle/adapter 520 for a battery pack showing an example implementation with a utility bag 540 according to one embodiment. In one embodiment, the battery pack receptacle/adapter 520 is coupled to a mounting element 910. In one embodiment, the mounting element 910 forms a fully or partially closed loop where material 930 may be fastened within a channel 920 within the mounting element 910. In one embodiment, the battery pack receptacle/adapter 520 is mounted horizontally within the utility bag 540 (or other device). In one embodiment, a battery pack may be inserted within the battery pack receptacle/adapter 520 in the direction of the arrow 990. In one embodiment, the battery pack receptacle/adapter 520 may be mounted on a wall of the utility bag 540 (either vertically, horizontally, or angled). In one embodiment, the battery pack receptacle/adapter 520 is either permanently or removably connected to the material 930.

In one embodiment, the battery pack receptacle is similar to a receptacle for charging battery packs used for cordless devices or tools (e.g., cordless drills, cordless screwdrivers, cordless saws, cordless garden tools, cordless sanders, etc. In one embodiment, the battery pack receptacle/adapter 520 includes metal connectors 205 that make contact with contacts of an inserted battery pack for passing electricity from the battery pack to the battery pack receptacle/adapter 520 and through the cord 530 (add optionally to a USB connector 250.

In one or more embodiments, the battery pack receptacle/adapter 520 is movable to multiple connection portions of the interior portion of a utility bag 540 or other device in order to fit different sized battery packs. In one embodiment, the battery pack receptacle/adapter 520 includes multiple sized slots/grooves and multiple placed electrical connectors 205 for fitment of different battery pack sizes and or battery packs of different voltages.

In one or more embodiment, the battery pack receptacle/adapter 520 and respective components may be made of one or more of: ABS, reinforced polypropylene, polypropylene, high-density polyethylene, nylon material, hardened plastic, polymer, rubber, composite material, metal or metal alloy, etc., carbon fiber, fiberglass, or other similar or equivalent materials.

In one or more embodiments, the battery pack receptacle/adapter 520 embodiments may be coupled with battery packs that may be specific to a manufacturer in order to only fit specific types of battery packs. In other embodiments, the battery pack receptacle/adapter 520 embodiments may be a universal type of receptacle to fit one or more types of battery packs (e.g., including multiple sized/shaped electrical contact/connection components for adaptively connecting one of multiple different brand/type cordless battery pack). In one embodiment, battery pack receptacle/adapter 520 embodiments may hold battery packs having different types of voltages, such as 12 V., 18 V., 24 V., 36 V., etc. In one embodiment, battery pack receptacle/adapter 520 embodiments include a circuit that limits voltage/amperage for different types of electronic devices, which may have different power requirements. It should be noted that cordless device battery packs typically include a specifically designed housing with specific designed housing contours and electrical connections that are unique to each brand or manufacturer. The specific designed contours and electrical connections (or electrical contacts) are uniquely designed for the brand or manufacturer's cordless tools and battery pack chargers. One brand or manufacturer's battery packs do not work in other brand or manufacturer's cordless tools or battery pack chargers since the electrical contacts and contours are different from each other. The battery packs include multiple rechargeable batteries that are included in a housing that transfers the combined voltage from the multiple rechargeable batteries through electrical contacts on the exterior of the housing. In this way, a user just needs to slide in or insert the battery pack into a cordless power tool to take advantage of the combined voltage or power from the multiple batteries internal to the battery pack.

Figure 11:
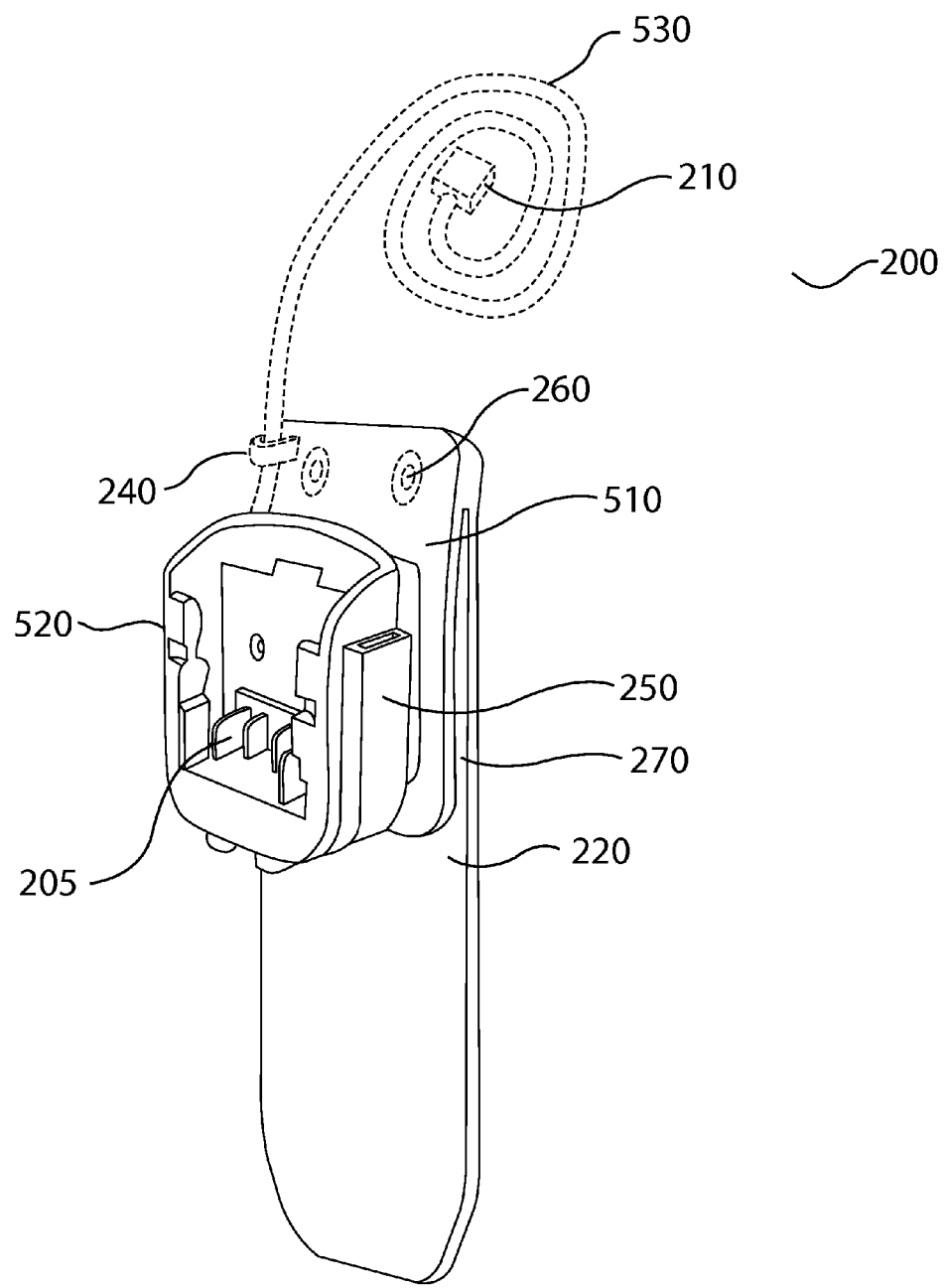
FIG. 11 illustrates a perspective view of a stand-alone receptacle/adapter for a battery pack bag according to one embodiment.

FIG. 11 illustrates a perspective view 200 of a battery pack receptacle/adapter 520 for a cordless device battery pack (e.g., a cordless drill, cordless saw, cordless chainsaw, cordless vacuum, etc.) according to one embodiment. In one embodiment, the battery pack receptacle/adapter 520 may include one or more USB connection ports (connector(s)) 250. In one embodiment, the battery pack receptacle/adapter 520 includes a USB cord 530 having a length (e.g., 1 foot, two feet, three feet, six feet, etc.) and including a USB port (or connector) 210 at the end (e.g., male or female). In one embodiment, the length of the USB cord 530 may comprise any desirable length and may be based on implementation (e.g., 6 in.-6 ft., etc.). In one embodiment, the battery pack receptacle/adapter 520 may have more than one USB connection ports 250 that are integrated with the battery pack receptacle/adapter 520. In one embodiment, the battery pack receptacle/adapter 520 may include a cord winding portion to wind the cord 530. In some embodiments, the cord 530 is optional and may or may not be included with the battery pack receptacle/adapter 520. In one embodiment, the cord 530 is removably or permanently coupled to the battery pack receptacle/adapter 520.

In one embodiment, the battery pack receptacle/adapter 520 may include attachment portions 260 for either permanently or removably attaching the battery pack receptacle/adapter 520 to a utility bag or other device. In one embodiment, the battery pack receptacle/adapter 520 may include a channel or cut-out portion for passing the cord 530. In one embodiment, the battery pack receptacle/adapter 520 includes a front coupling portion 510 and a rear coupling portion 220. In one embodiment, a gap 270 between the front coupling portion 510 and the rear coupling portion 220 may be fitted over non-rigid or semi-rigid material of a pocket, bag apparatus, a utility bag or other device, placed over a rigid material of a device for placement of the battery pack receptacle/adapter 520. In one embodiment, the USB cord 530 may be fitted into a conduit, tunnel, groove, etc. of utility bags, bag apparatus, housings, cases, boxes, coolers, clothing, etc. In one embodiment, the rear coupling portion 220 has a length equal to, less than, or greater than the front coupling portion 510.

In one embodiment, the battery pack receptacle/adapter 520 may be positioned in a pocket, clipped to a pocket, part of a pocket, positioned inside a utility bag, part of a wall of a bag apparatus, utility bag, etc. (e.g., a side-wall, an end-wall, etc.), container, case, box, cooler, etc. as desired. In one embodiment, the receptacle/adapter 520 includes battery terminal connectors 205 (e.g., universal or fixed based on type/brand of battery pack) that couple with terminals of a battery pack to transfer the voltage or power to the battery pack receptacle/adapter 520 to power the USB connection port 250 and/or the USB cord 530 and USB port 210 (and any other optional USB ports). In one embodiment, the battery pack receptacle/adapter 520 includes a USB cord guide element 240 (e.g., a loop, open loop, removable portion of a loop, etc.) that may be placed around or over the USB cord 530 for maintaining the USB cord 530 in a desired position.

Figure 12:
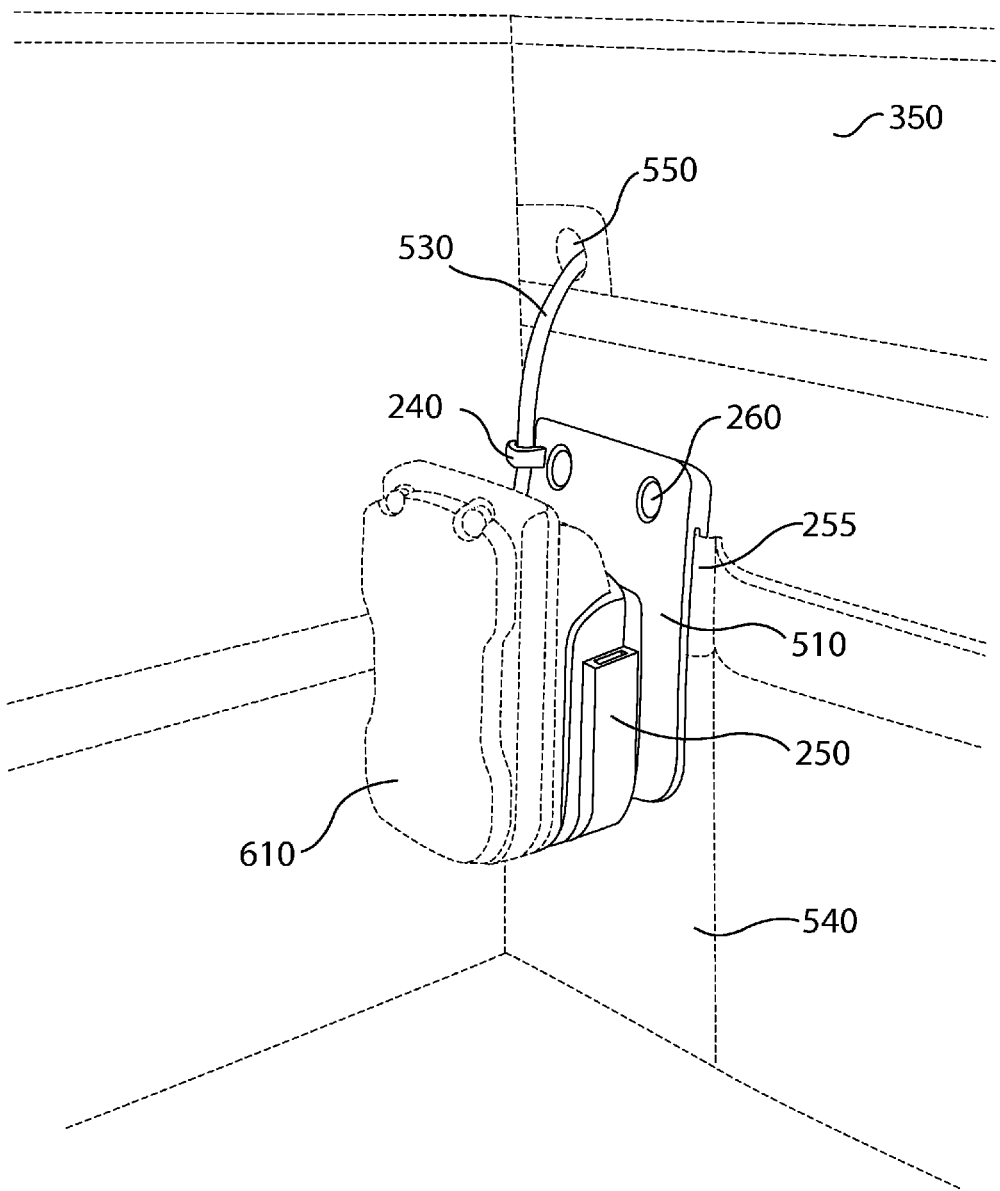
FIG. 12 illustrates a perspective view of the receptacle/adapter for a battery pack shown in FIG. 11 and showing an example implementation with an inserted example battery pack and an example utility bag according to one embodiment.

FIG. 12 illustrates a perspective view 350 of the battery pack receptacle/adapter 520 for a cordless battery pack as illustrated in FIG. 11 and showing an example implementation with a utility bag 540 (or other device, bag apparatus, housing, etc.) according to one embodiment. In one embodiment, the battery pack 610 is slid, inserted or placed into the battery pack receptacle/adapter 520 and connects with the battery terminal connectors 205 for powering the USB connection port 250 and the optional USB cord 530. In one embodiment, the cord 530 is disposed within a through-hole 550 and into a conduit or channel of the utility bag 540 (or other device). In one embodiment, the front coupling portion 510 fits over material 255 of the utility bag 540 (or other device) and the rear coupling portion 220 fits within or behind the material 255 for holding the battery pack receptacle/adapter 520 in place.

Figure 13:
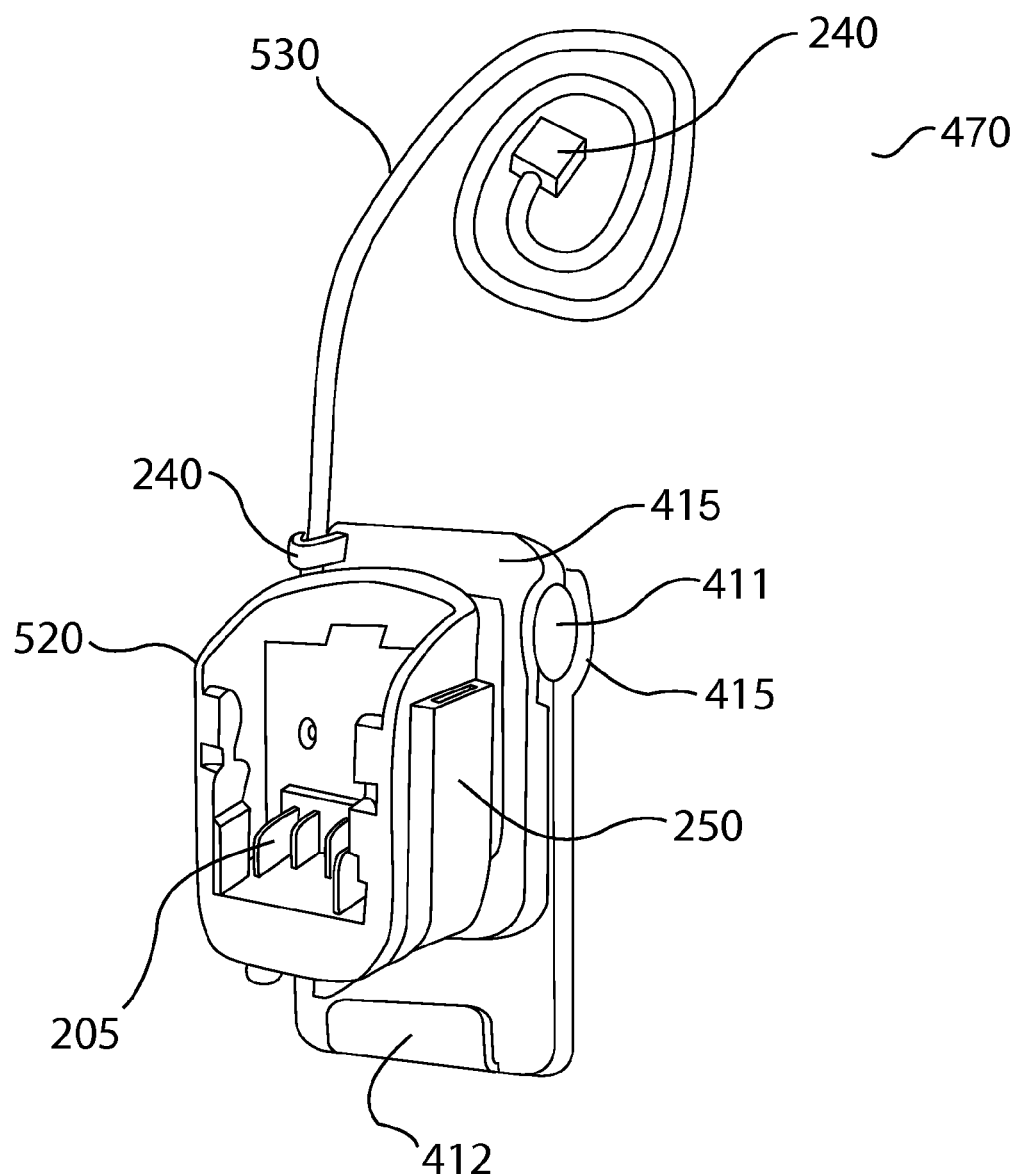
FIG. 13 illustrates a perspective view of another stand-alone receptacle/adapter for a battery pack according to one embodiment.

FIG. 13 illustrates a perspective view 470 of another battery pack receptacle/adapter 520 for a battery pack according to one embodiment. In one embodiment, the battery pack receptacle/adapter 520 includes a front coupling portion 414, a rear coupling portion 415, a rotational element 411, and a retaining portion 412. In one embodiment, retaining portion 412 is configured for coupling material (sleeve, channel, slot, opening, etc.) of a utility bag (or other device) behind the retaining portion 412, which creates a locking or fastening of the rear coupling portion 415 and prevents removal unless the rear coupling portion 415 is forced downward to release the material from the retaining portion 412.

In one embodiment, a battery pack slides or clips into place on the battery pack receptacle/adapter 520. In one embodiment, the front coupling portion 414, rotational element 411 and the rear coupling portion 415 form a spring clip type of device (using flexible/bendable metal, a spring, spring clamp, etc.) that may be pinched or grasped at the top to force the lower portion of the front coupling portion 414 and the lower portion of the rear coupling portion 415 apart, and released to force the lower portion of the front coupling portion 414 and the lower portion of the rear coupling portion 415 towards one another to clip to material.

Figure 14:
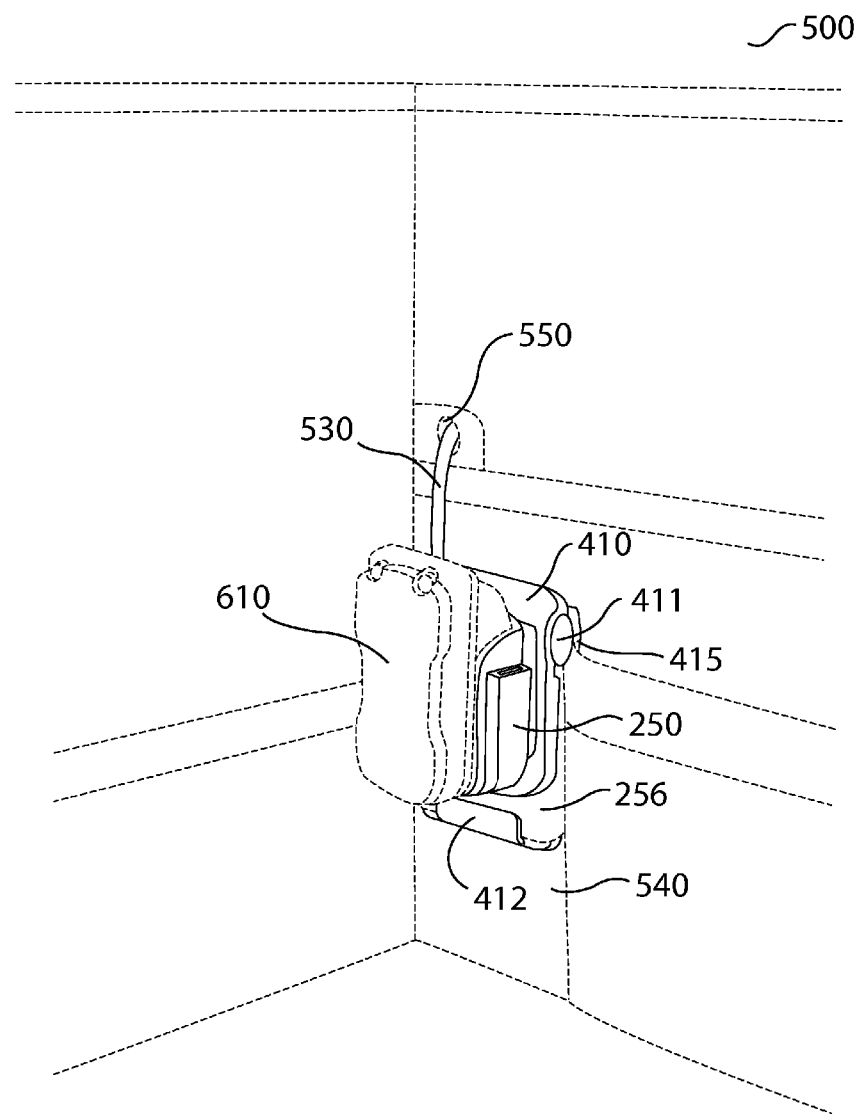
FIG. 14 illustrates a perspective view of the receptacle/adapter for a battery pack shown in FIG. 13 showing an example implementation with a utility bag according to one embodiment.

FIG. 14 illustrates a perspective view 500 of the battery pack receptacle/adapter 520 shown in FIG. 13 for an example battery pack 610 showing an example implementation with a utility bag 540 (or other device) according to one embodiment. In one embodiment, retaining portion 412 has material of a sleeve 256 of a utility bag 540 (or other device) fit within the sleeve 256 when inserted, which creates a locking or fastening of the rear coupling portion 415 and prevents removal unless the front coupling portion 414 and rear coupling portion 415 are forced downward to release the material of the sleeve 256 from the retaining portion 412. In one embodiment, the material of the sleeve 256 overlaps a portion of the utility bag 540 (or other device). In one embodiment, the battery pack receptacle/adapter 520 is removably coupled to the material of the sleeve 256. In one embodiment, a battery pack 610 slides or clips into place on the battery pack receptacle/adapter 520 in a downward direction. In one embodiment, the front coupling portion 414, rotational element 411 and the rear coupling portion 415 form a spring clip type of device that may be pinched or grasped at the top to force the lower portion of the front coupling portion 410 and the lower portion of the rear coupling portion 415 apart, and released to force the lower portion of the front coupling portion 414 and the lower portion of the rear coupling portion 415 towards one another to clip to material, such as material of the sleeve 256.

In another example embodiment, the battery pack receptacle/adapter 520 may be permanently attached to a utility bag 540 (or other device or platform), for example, using rivets, nuts and bolts, heat welding, epoxy welding, snap fit components, product integration, etc. In another example embodiment, the battery pack receptacle/adapter 520 may be mounted to material 256 internally or externally to the utility bag 540 (or other device).

In one embodiment, the cord 530 is disposed within a through-hole 550 and into a conduit or channel of the utility bag 540 (or other device). In one embodiment, the front coupling portion 414 fits over material of the sleeve 256 of the utility bag 540 (or other device) and the rear coupling portion 415 fits within or behind the material of the sleeve 256 for holding the battery pack receptacle/adapter 520 in place.

Figure 15:
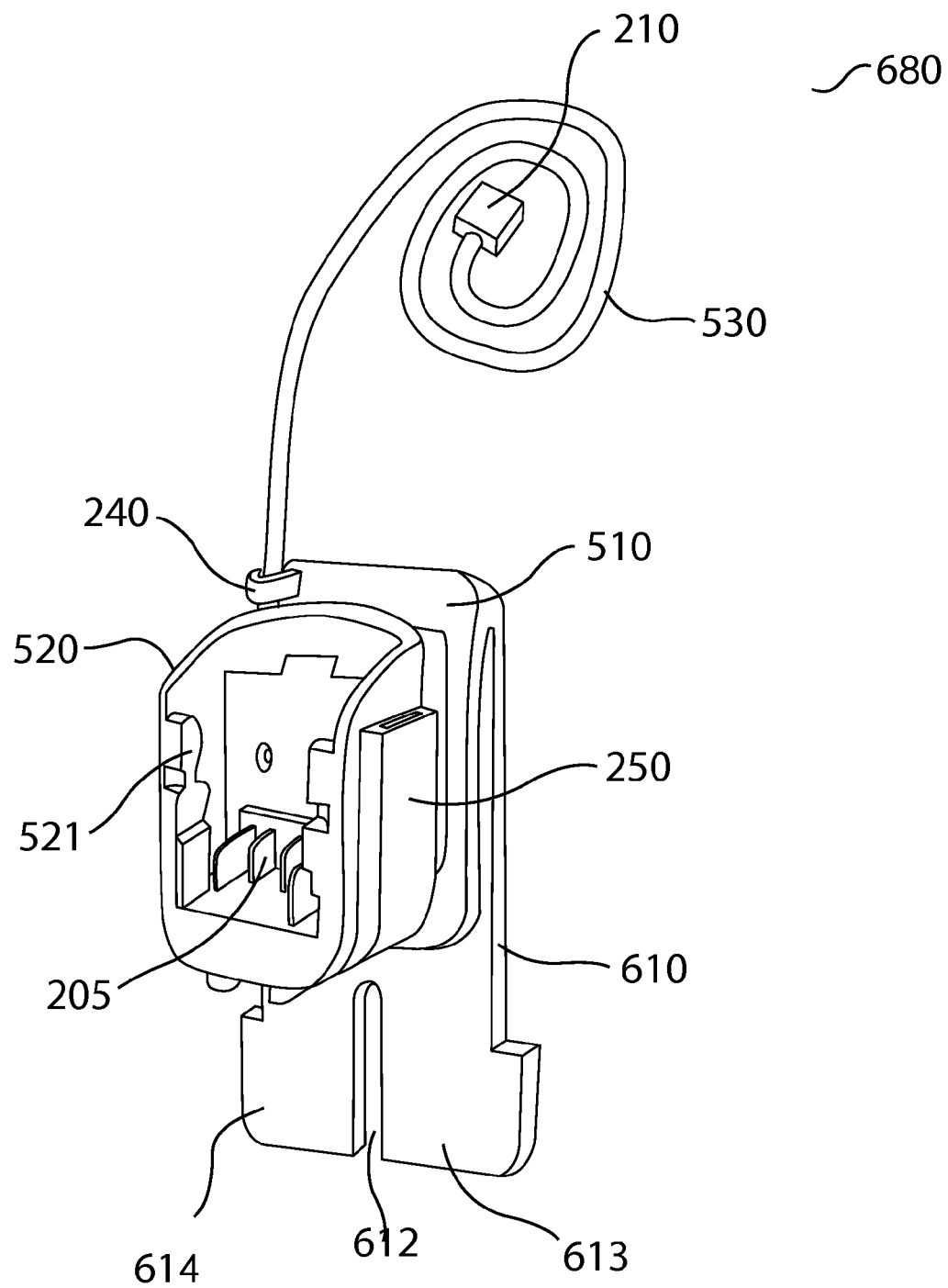
FIG. 15 illustrates a perspective view of still another receptacle/adapter for a battery pack according to one embodiment.

FIG. 15 illustrates a perspective view 680 of still another battery pack receptacle/adapter 520 for a cordless device battery pack according to one embodiment. In one embodiment, the battery pack receptacle/adapter 520 includes a front coupling portion 517, a rear coupling portion 610, a first foot portion 613, and a second foot portion 612, where a gap or groove 612 is formed between the first foot portion 613 and the second foot portion 614. In one embodiment, the foot portions 613 and 614 may be forced towards one another (each towards the gap 612). In one embodiment, a battery pack slides or clips into place on the battery pack receptacle/adapter 520 behind or with the battery retaining portion 521. In one embodiment, the battery retaining portion 521 may be configured for one or more specific manufacturer's type of battery pack. In other embodiments, the retaining portion 521 may be designed to retain multiple types of manufacturer specific designed batteries.

Figure 16:
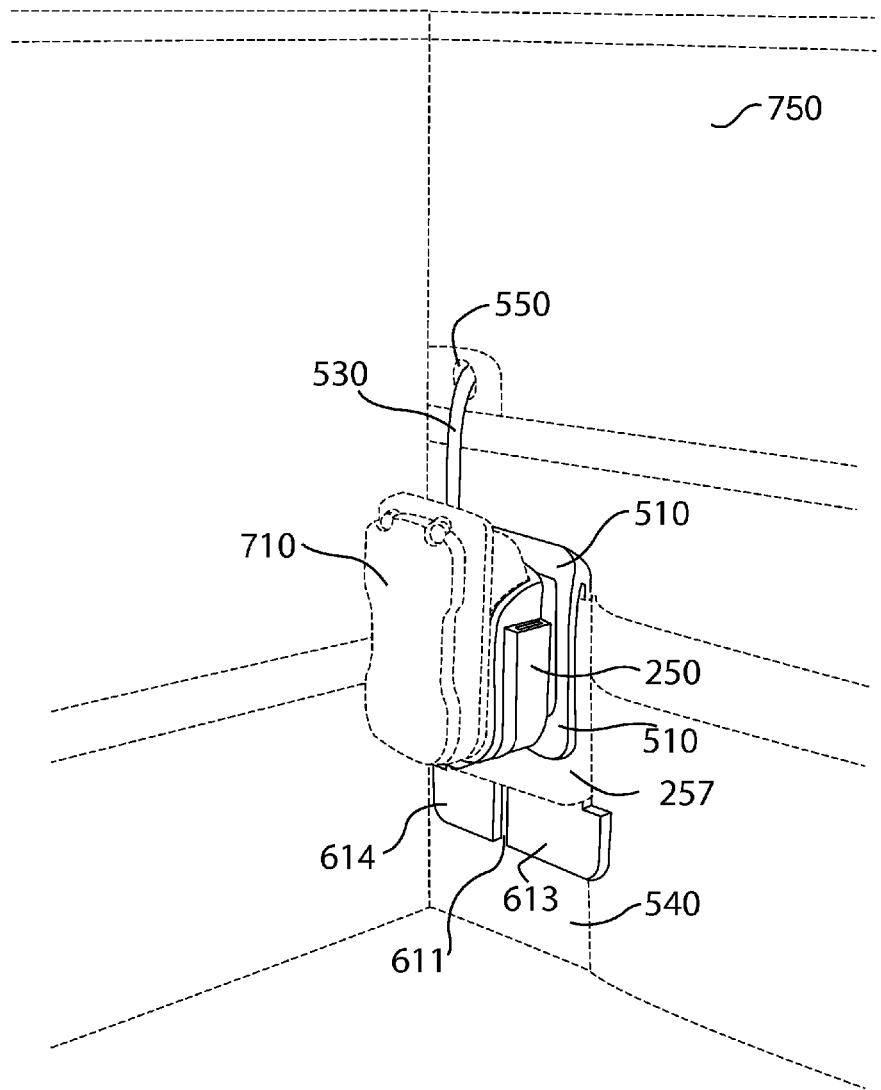
FIG. 16 illustrates a perspective view of the receptacle/adapter for a battery pack shown in FIG. 15 and showing an example implementation with a utility bag according to one embodiment.

FIG. 16 illustrates a perspective view 750 of the battery pack receptacle/adapter 520 for a battery pack as illustrated in FIG. 15 and showing an example implementation with a utility bag 540 (or other device) according to one embodiment. In one embodiment, the foot portions 613 and 614 may be forced towards one another (each towards the gap 612) such that the width of the lower rear coupling portion 610 fits within the material 257 when inserted and expands back after the forced is removed, which creates a locking or fastening of the foot portions 612 and 613 outside the width of material of a sleeve 257 and prevents removal unless the foot portions 613 and 614 are forced towards each other and the battery pack receptacle/adapter 520 is forced out of the material of the sleeve 257 that overlaps a portion of the utility bag 540 (or other device). In one embodiment, the material of the sleeve 257 overlaps a portion of the utility bag 540 (or other device). In one embodiment, the battery pack receptacle/adapter 520 is removably coupled to the material of the sleeve 257. In one embodiment, a battery pack 710 slides or clips into place on the battery pack receptacle/adapter 520.

In another example embodiment, the battery pack receptacle/adapter 520 may be permanently attached to a utility bag 540 (or other device), for example, using rivets, nuts and bolts, heat welding, epoxy welding, etc. In another example embodiment, the battery pack receptacle/adapter 520 may be mounted to material of the sleeve 257 internally or externally to the utility bag 540 (or other device). In other embodiments, the battery pack receptacle/adapter 520 may be removably coupled to a utility bag, bag apparatus, platform, other device, etc. using clips, snaps, hook and loop fasteners, flexible/stretchable bands/holders, pockets, compartments, etc.

In one embodiment, the cord 530 is disposed within a through-hole 550 and into a conduit or channel of the utility bag 540 (or other device). In one embodiment, the front coupling portion 517 fits over material of the sleeve 257 of the utility bag 540 (or other device) and the rear coupling portion 610 fits within or behind the material of the sleeve 257 for holding the battery pack receptacle/adapter 520 in place.

Figure 17:
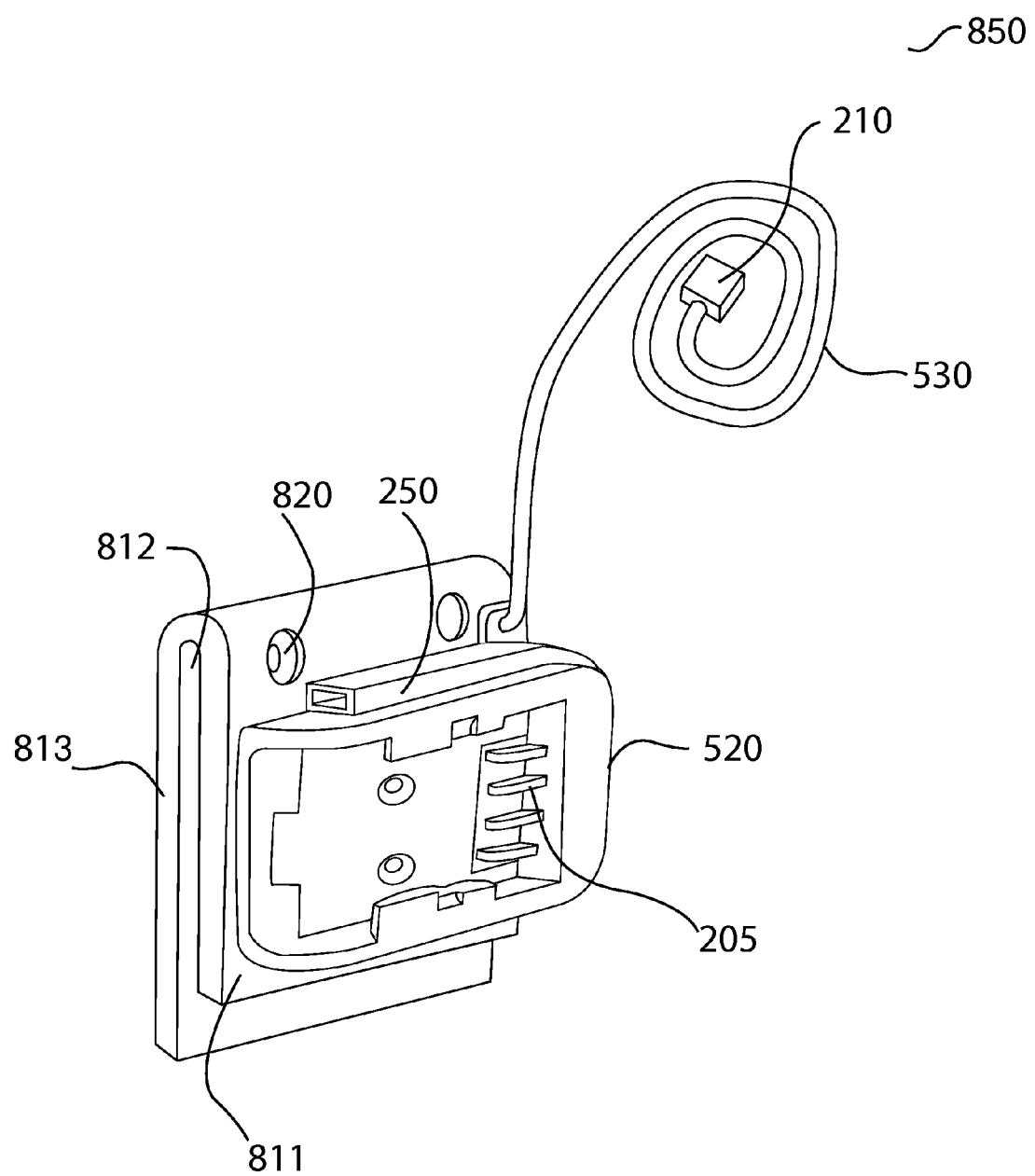
FIG. 17 illustrates a perspective view of another stand-alone receptacle/adapter for a battery pack according to one embodiment.

FIG. 17 illustrates a perspective view 850 of yet another battery pack receptacle/adapter 520 for a battery pack according to one embodiment. In one embodiment, the battery pack receptacle/adapter 520 is positioned horizontally on a U-shaped attachment mounting element including a front coupling element 811 and a rear coupling element 813 with a gap 812 formed in-between. In one embodiment, the battery pack receptacle/adapter 520 is fixed to the front coupling element 811. In one embodiment, a battery pack (e.g., battery pack 710, FIG. 16) slides or clips into place on the battery pack receptacle/adapter 520. In one embodiment, the battery pack receptacle/adapter 520 may be removably coupled to a utility bag or other device, or permanently positioned on the a utility bag or other device using the through-holes 820 and fastening (e.g., using known fastening means, such as rivets, bolts/screws, snaps, etc.). In one embodiment, the battery pack receptacle/adapter 520 may be fastened to a utility bag or other device using hook and loop fasteners (e.g., on the back of the rear coupling device 813 and the item to be attached to.

Figure 18:
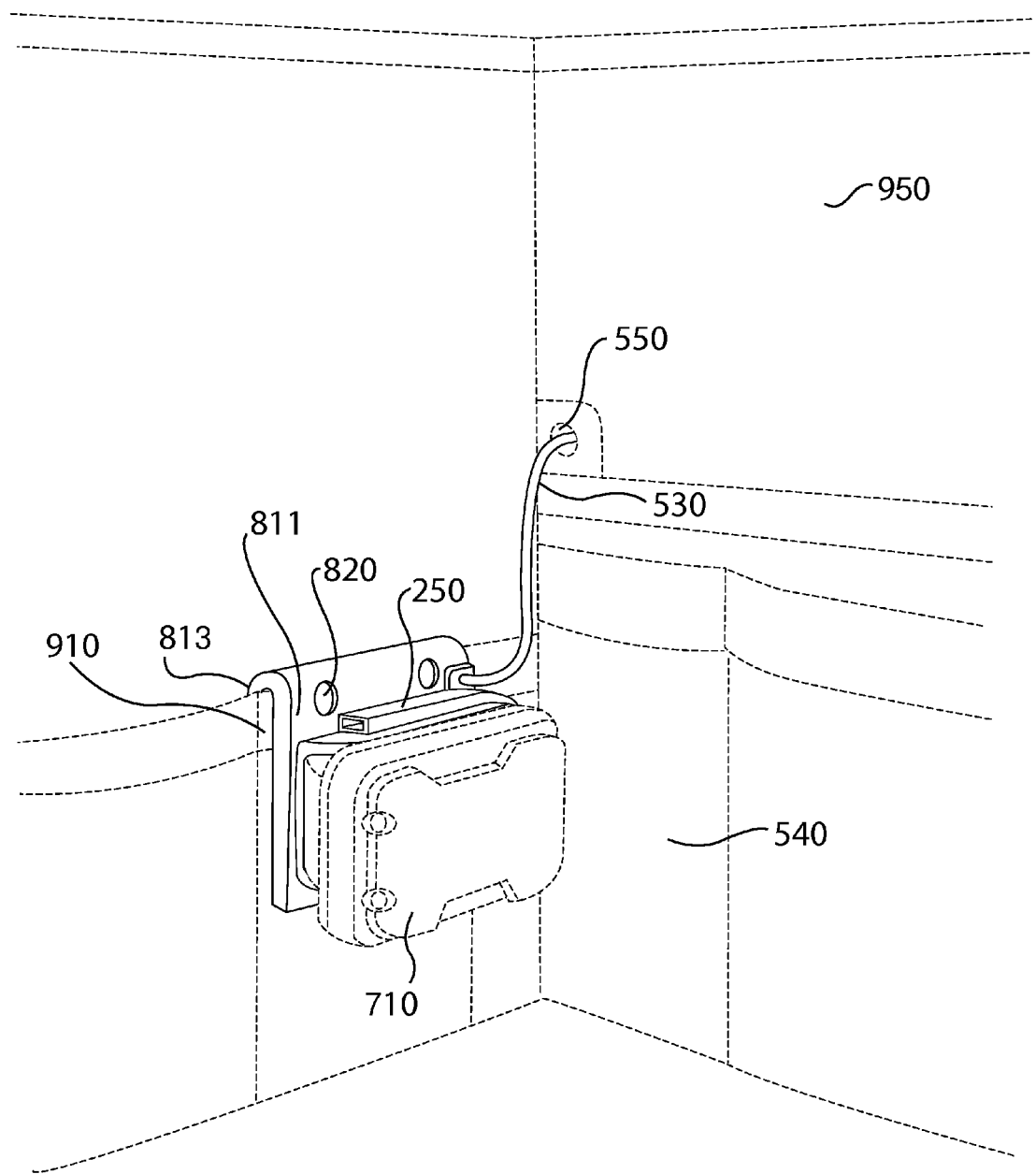
FIG. 18 illustrates a perspective view of the receptacle/adapter for a battery pack shown in FIG. 17 and showing an example implementation with a utility bag according to one embodiment.

FIG. 18 illustrates a perspective view 950 of the battery pack receptacle/adapter 520 for a battery pack 710 as illustrated in FIG. 17 and showing an example implementation with a utility bag 540 (or other device or housing) according to one embodiment. In one embodiment, the battery pack receptacle/adapter 520 may be mounted horizontally on a pocket 910 or material (e.g., of a sleeve) that provides for placement of the front coupling element 811 and the rear coupling element 813 over the pocket 910 or material. In one embodiment, a battery pack 710 slides or clips into place on the battery pack receptacle/adapter 520. In one embodiment, the battery pack receptacle/adapter 520 may be removably coupled to the pocket 910 or permanently positioned on the utility bag 540 (or other device) using the through-holes 820 and fastening (e.g., using known fastening means, such as rivets, bolts/screws, snaps, etc.). In one embodiment, the battery pack receptacle/adapter 520 may be fastened to the utility bag 540 (or other device) using hook and loop fasteners.

In one or more embodiments, the battery pack receptacle/adapter 520 embodiments are similar to a receptacle for charging battery packs used for cordless devices or tools (e.g., cordless drills, cordless screwdrivers, cordless saws, cordless garden tools, cordless sanders, etc. In one or more embodiments, the battery pack receptacle/adapter 520 includes metal connectors 205 that make contact with contacts of an inserted battery pack (e.g., battery pack 710) for passing electricity from the battery pack to the battery pack receptacle/adapter 520 and through the cord USB connector 250 and USB cord 530 (if included).

Figure 19:
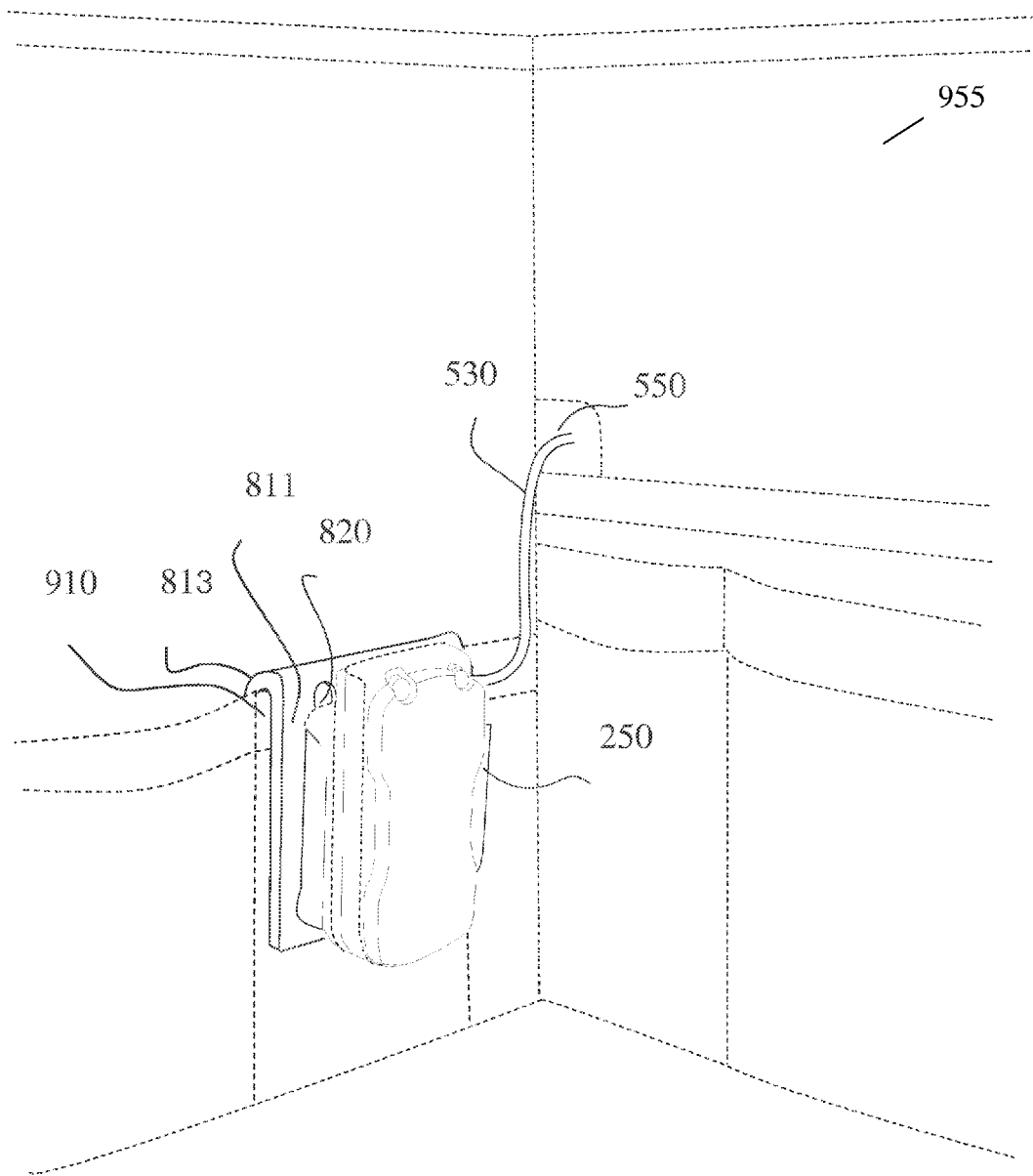
FIG. 19 illustrates a perspective view of the receptacle/adapter for a battery pack shown in FIG. 18 shown in another orientation and showing an example implementation with a utility bag according to one embodiment.

FIG. 19 illustrates a perspective view 955 of the battery pack receptacle/adapter 520 for a battery pack (e.g., battery pack 710, FIG. 18) shown in another orientation (vertical) and showing an example implementation with a utility bag (e.g., utility bag 540) according to one embodiment. In one embodiment, the battery pack receptacle/adapter 520 is rotatable between horizontal and vertical orientations on the front coupling element 811. In other embodiments, the battery pack receptacle/adapter 520 may be fixed in a vertical orientation.

Figure 20:
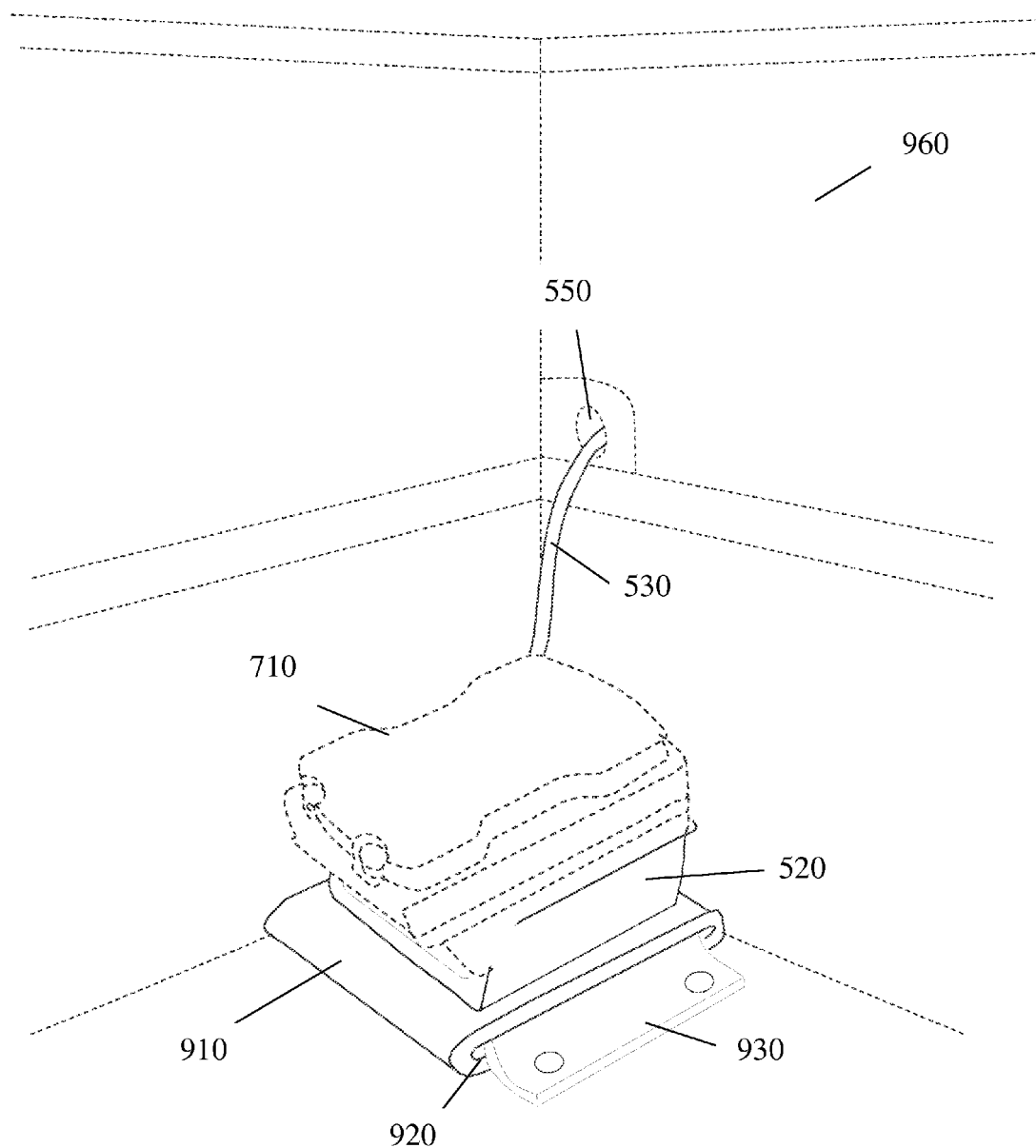
FIG. 20 illustrates a perspective view of another receptacle/adapter for a battery pack and showing an example implementation with a utility bag according to one embodiment.

FIG. 20 illustrates a perspective view 960 of another battery pack receptacle/adapter 520 for a battery pack 710 and showing an example implementation with a utility bag 540 (or other device, platform, housing, etc.) according to one embodiment. In one embodiment, the battery pack receptacle/adapter 520 is coupled to a mounting element 910. In one embodiment, the mounting element 910 forms a fully or partially closed loop where material 930 may be fastened within a fastening channel 920 within the mounting element 910. In one embodiment, the battery pack receptacle/adapter 520 is mounted horizontally within the utility bag 540 (or other device). In one embodiment, a battery pack may be inserted within the battery pack receptacle/adapter 520. In one embodiment, the battery pack receptacle/adapter 520 may be mounted on a wall of the utility bag 540 (either vertically, horizontally, or angled). In one embodiment, the battery pack receptacle/adapter 520 is either permanently or removably connected to the material 930.

In one or more embodiments, the battery pack receptacle/adapter 520 is movable to multiple connection portions of the interior portion of a utility bag 540 or other device in order to fit different sized battery packs. In one embodiment, the battery pack receptacle/adapter 520 includes multiple sized slots/grooves and multiple placed electrical connectors 205 (and associated wiring) for universal connection of different battery pack sizes (e.g., different brands) and or battery packs of different voltages.

In one or more embodiments, the battery pack receptacle/adapter 520 and respective components may be made of one or more of: ABS, reinforced polypropylene, polypropylene, high-density polyethylene, nylon material, hardened plastic, polymer, rubber, composite material, metal or metal alloy, etc., carbon fiber, fiberglass, or other similar or equivalent materials.

In one embodiment, the battery pack receptacle is similar to a receptacle for charging battery packs used for cordless devices or tools (e.g., cordless drills, cordless screwdrivers, cordless saws, cordless garden tools, cordless sanders, etc. In one embodiment, the battery pack receptacle/adapter 520 includes metal connectors 205 that make contact with contacts of an inserted battery pack for passing electricity from the battery pack to the battery pack receptacle/adapter 520 and through the cord 530 (add optionally to a USB connector 250, e.g., FIG. 18).

In one or more embodiments, the battery pack receptacle/adapter 520 embodiments may couple with battery packs that may be specific to a manufacturer in order to only fit specific types of battery packs. In other embodiments, the battery pack receptacle/adapter 520 embodiments may be a universal type of receptacle to fit one or more types of battery packs. In one embodiment, battery pack receptacle/adapter 520 embodiments may hold batteries having different types of voltages, such as 12 V., 18 V., 24 V., 36 V., etc. In one embodiment, battery pack receptacle/adapter 520 embodiments include a circuit that limits voltage/amperage for different types of electronic devices, which may have different power requirements.

Figure 21:
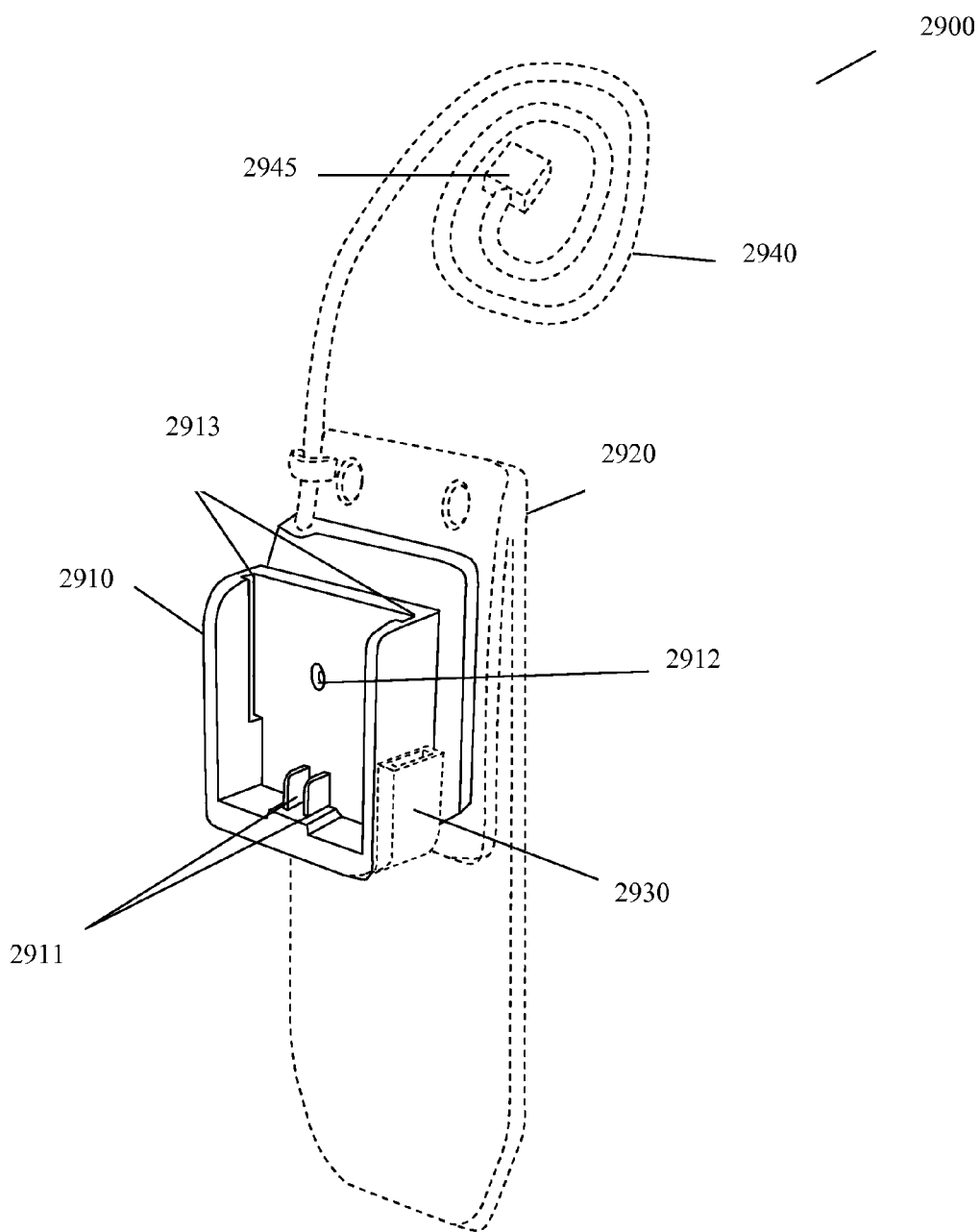
FIG. 21 illustrates a perspective view of a receptacle/adapter for a battery pack configured for accepting different multiple battery pack adapters according to one embodiment.

FIG. 21 illustrates a perspective view 2900 of a (stand-alone) battery pack receptacle/adapter 2910 for a cordless device battery pack (e.g., battery pack 710, FIG. 18, battery pack 3410, FIG. 26, etc.) configured for accepting multiple battery pack adapters (e.g., adapters 3110, 3120, 3130, 3140, FIG. 23) according to one embodiment. In one embodiment, the battery pack receptacle/adapter 2910 may include one or more USB connection ports (connector(s)) 2930 (e.g., male or female connector(s)) for connecting to one or more USB devices (e.g., a cell/smart phone, music player, camera, lighting element, computing device, wearable smart device, etc.). In one embodiment, the battery pack receptacle/adapter 2910 includes a USB cord 2940 having a length (e.g., 1 foot, two feet, three feet, six feet, etc.) and including a USB port (or connector) 2945 at the end (e.g., male or female). In one embodiment, the length of the USB cord 2940 may comprise any desirable length and may be based on implementation (e.g., 6 in.-6 ft., etc.). In one embodiment, the battery pack receptacle/adapter 2910 may have more than one USB connection ports 2930 that are integrated with the battery pack receptacle/adapter 2910. In one embodiment, the battery pack receptacle/adapter 2910 may include a cord winding portion to wind the cord 2940. In some embodiments, the cord 2940 is optional and may or may not be included with the battery pack receptacle/adapter 2910. In one embodiment, the cord 2940 is removably or permanently coupled to the battery pack receptacle/adapter 2910.

In one embodiment, the battery pack receptacle/adapter 2910 may be either permanently connected to or removably connected to an attachment portion 2920 (e.g., a slide-over coupler, a clamp-type coupler, spring-type coupler, hook and loop fasteners, clips, placed in a pocket or sleeve, etc.) for either permanently or removably attaching the battery pack receptacle/adapter 2910 to a utility bag, platform, bag apparatus, housing or other device. In one embodiment, the battery pack receptacle/adapter 2910 may include a channel or cutout portion for passing the cord 2940. In one embodiment, the battery pack receptacle/adapter 2910 includes retaining channels or grooves 2913 in a receptacle/adapter body of the battery pack receptacle/adapter 2910 for coupling with a rear portion of a battery pack adapter (e.g., adapters 3110, 3120, 3130, 3140, FIG. 23). In one embodiment, the battery pack receptacle/adapter 2910 includes an optional through-hole for fastening a battery pack adapter (e.g., adapters 3110, 3120, 3130, 3140, FIG. 23) to the battery pack receptacle/adapter 2910. In one embodiment, the fastening means may include a screw, nut/bolt, socket-type fastener, etc. In one embodiment, the battery pack receptacle/adapter 2910 includes battery pack adapter electrical connectors 2911 for electrically connecting to a battery pack adapter (e.g., adapters 3110, 3120, 3130, 3140, FIG. 23) for transferring voltage/power from a battery pack through the adapter, to the battery pack receptacle/adapter 2910 and to the USB port 2945 and/or one or more USB connection ports 2930 for powering electronic devices using a USB connection for power.

In one embodiment, the battery pack receptacle/adapter 2910 includes two (2) electrical connectors 2911. In other embodiments, other numbers of connections for the housing electrical connectors may be used (e.g., 4, 6, etc.). In one embodiment, the number of electrical connectors 2911 matches the number of associated battery pack adapter electrical connectors (e.g., contacts 3311, FIG. 33) for the adapter(s) being used (e.g., adapters 3110, 3120, 3130, 3140, FIG. 23).

Figure 22:
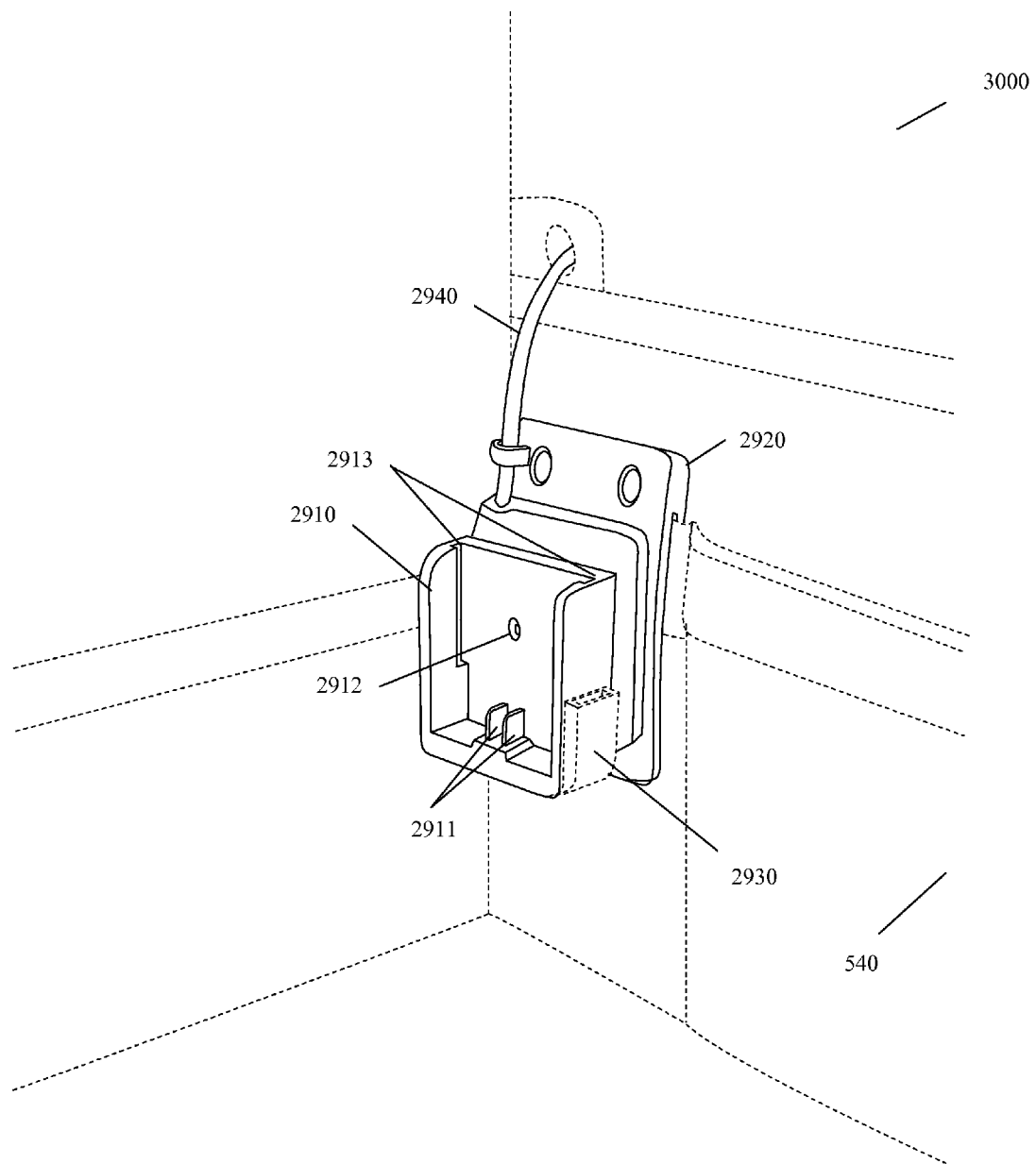
FIG. 22 illustrates a perspective view of the receptacle/adapter for a battery pack configured for accepting different multiple battery pack adapters, showing an example implementation with a utility bag or other device according to one embodiment.

FIG. 22 illustrates a perspective view 3000 of the battery pack receptacle/adapter 2910 for a cordless device battery pack configured for accepting multiple battery pack adapters (e.g., adapters 3110, 3120, 3130, 3140, FIG. 23) showing an example implementation with a utility bag 540 (or other device, housing, bag apparatus, platform, etc.) according to one embodiment. In one embodiment, the battery pack receptacle/adapter 2910 includes an attachment device 2920 including a front coupling portion (e.g., front coupling portion 510, FIG. 11) and a rear coupling portion (e.g., rear coupling portion 220, FIG. 11). In one embodiment, a gap (e.g., gap 270, FIG. 11) between the front coupling portion and the rear coupling portion may be fitted over non-rigid or semi-rigid material of a pocket, sleeve, bag apparatus, a utility bag or other device, placed over a rigid material of a device for placement of the battery pack receptacle/adapter 2910. In one embodiment, the USB cord 2940 may be fitted into a conduit, tunnel, groove, etc. of utility bags, bag apparatus, housings, cases, boxes, coolers, clothing, etc. In one embodiment, the rear coupling portion has a length equal to, less than, or greater than the front coupling portion.

In one embodiment, the battery pack receptacle/adapter 2910 may be positioned in a pocket, clipped to a pocket or sleeve, part of a pocket, positioned inside a utility bag, part of a wall of a bag apparatus, utility bag, placed in a compartment, etc. (e.g., a side-wall, an end-wall, etc.), container, case, box, cooler, etc. as desired. In one embodiment, the battery pack receptacle/adapter 2910 includes a USB cord guide element (e.g., a loop, open loop, removable portion of a loop, etc.) that may be placed around or over the USB cord 2940 for maintaining the USB cord 2940 in a desired position. It should be noted that other above-mentioned attachment devices/elements may be used other than the depicted attachment device 2920 for coupling (removably, permanently, etc.) the battery pack receptacle/adapter 2910 to a device, housing or platform.

Figure 23:
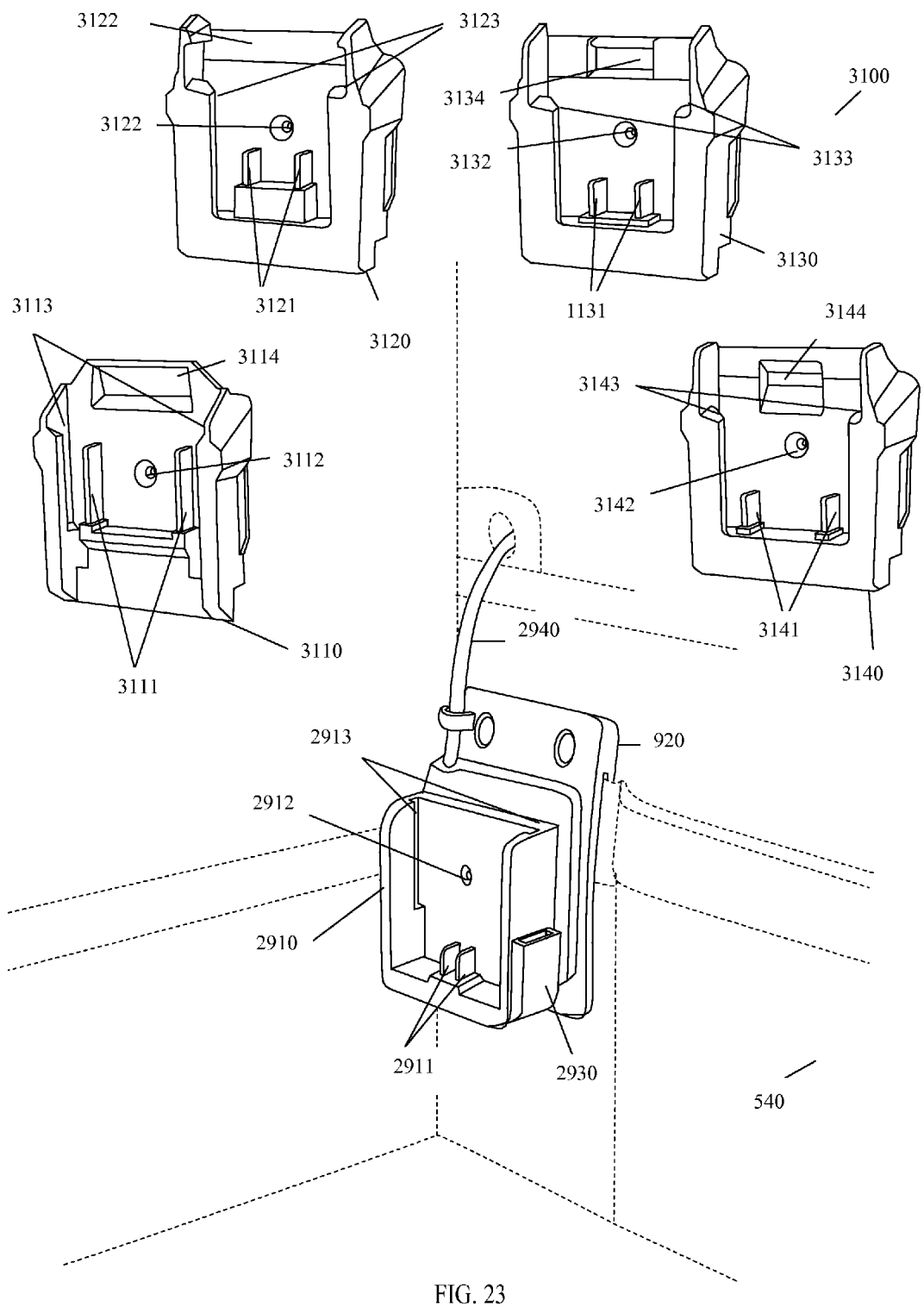
FIG. 23 illustrates a perspective view of the receptacle/adapter for a battery pack configured for accepting different multiple battery pack adapters showing an example implementation with a utility bag or other device, and showing multiple battery pack adapters according to one embodiment.

FIG. 23 illustrates a perspective view 3100 of the battery pack receptacle/adapter 2910 for a cordless device battery pack configured for accepting multiple battery pack adapters 3110, 3120, 3130, and 3140, showing an example implementation with a utility bag 540 (or other device, housing, bag apparatus, platform, etc.) according to one embodiment. In one embodiment, each of the battery pack adapters 3110, 3120, 3130, and 3140 are distinct from one another in that each of the battery pack adapters 3110, 3120, 3130, and 3140 are configured for distinct cordless battery packs (e.g., different manufacturers, different brands, etc.). That is, many different brands of cordless device s that use battery packs to power the cordless devices are made so that they will not fit or work with battery chargers or the cordless devices from other brands. Therefore, if a user has cordless tools from different manufacturers, they need to use different battery chargers and different batteries for the different brand cordless tools. In one embodiment, if a user of a cordless device desired to use the battery pack receptacle/adapter 2910, an appropriate adapter is selected from the adapters 3110, 3120, 3130, and 3140 for the particular brand of cordless battery pack.

In one embodiment, the adapter 3110 includes metal electrical connections 3111 for connecting to a first specific brand of battery pack, the adapter 3120 includes electrical connections 3121 for connecting to a second specific brand of battery pack, the adapter 3130 includes electrical connections 3131 for connecting to a third specific brand of battery pack, and the adapter 3140 includes electrical connections 3141 for connecting to a fourth specific brand of battery pack. In one embodiment, the electrical connections from the adapter (e.g., electrical contacts 3111, 3121, 3131, or 3141) contact the electrical connectors 2911 of the battery pack receptacle/adapter 2910 via the contacts 3311 (FIG. 33) when the adapter is inserted into the battery pack receptacle/adapter 2910 for passing voltage from a battery pack that is inserted within the adapter to the USB cord 2940 to the USB port/connector 2945 and/or other USB ports/connectors (e.g., one or more USB connector(s)/port(s) 2930).

In one embodiment, adapter 3110 includes a through-hole 3112 that aligns with the through-hole 2912 of the battery pack receptacle/adapter 2910 for placing a fastener through the through-holes 3112 and 2912 for fixing the adapter 3110 to the battery pack receptacle/adapter 2910. In one embodiment, adapter 3120 includes a through-hole 3122 that aligns with the through-hole 2912 of the battery pack receptacle/adapter 2910 for placing a fastener through the through-holes 3122 and 2912 for fixing the adapter 3120 to the battery pack receptacle/adapter 2910. In one embodiment, adapter 3130 includes a through-hole 3132 that aligns with the through-hole 2912 of the battery pack receptacle/adapter 2910 for placing a fastener through the through-holes 3132 and 2912 for fixing the adapter 3130 to the battery pack receptacle/adapter 2910. In one embodiment, adapter 3140 includes a through-hole 3142 that aligns with the through-hole 2912 of the battery pack receptacle/adapter 2910 for placing a fastener through the through-holes 3142 and 2912 for fixing the adapter 3140 to the battery pack receptacle/adapter 2910.

In one embodiment, adapter 3110 includes retaining portions 3113 and 3114 for holding/placement an associated battery back for a cordless device within the adapter. In one embodiment, the retaining portions 3113 and 3114 of the adapter 3110 provide similar placement support as if the associated battery pack is being placed in an associated charging device (i.e., a charging device configure for the specific battery pack). In one embodiment, adapter 3120 includes retaining portions 3123 and 3122 for holding/placement an associated battery back for a cordless device within the adapter. In one embodiment, the retaining portions 3123 and 3124 of the adapter 3120 provide similar placement support as if the associated battery pack is being placed in an associated charging device (i.e., a charging device configure for the specific battery pack). In one embodiment, adapter 3130 includes retaining portions 3133 and 3134 for holding/placement an associated battery back for a cordless device within the adapter. In one embodiment, the retaining portions 3133 and 3134 of the adapter 3130 provide similar placement support as if the associated battery pack is being placed in an associated charging device (i.e., a charging device configure for the specific battery pack). In one embodiment, adapter 3140 includes retaining portions 3143 and 3144 for holding/placement an associated battery back for a cordless device within the adapter. In one embodiment, the retaining portions 3143 and 3144 of the adapter 3140 provide similar placement support as if the associated battery pack is being placed in an associated charging device (i.e., a charging device configure for the specific battery pack).

In one embodiment, the adapters 3110, 3120, 3130, and 3140 may include an indicator for informing a user of the specific brand that the adapter is configured to work with. In one embodiment, the indicator may include a letter, a number, a color, a name, etc. In another embodiment, the adapters 3110, 3120, 3130, and 3140 and the battery pack receptacle/adapter 2910 may include an integrated circuit (IC) that includes a speaker and processor to provide recorded speech or synthetic speech indicating the brand when the adapter is placed in the battery pack receptacle/adapter 2910. In other embodiments, a light indicator (e.g., an LED) may illuminate when an adapter is placed in the battery pack receptacle/adapter 2910 to indicate a position for a particular brand that the adapter is configured to accept battery pack coupling with. In the simplest form, in one embodiment, the adapters may be visually matched to the particular brand of battery pack that they are configured to work with based on the electrical connector configuration, congruent fitment of the electrical contact side of the battery pack with the electrical contact side of the adapter, etc.

In one embodiment, the adapters 3110, 3120, 3130, and 3140 while having specific electrical connections (e.g., number of electrical connections, spacing and placement of the electrical connections, shape and form of the adapter body for congruent fitment of the associated battery pack, height and shape of electrical connections, etc.) for the associated brand of battery pack (e.g., electrical battery pack connectors 3111 for adapter 3110, electrical battery pack connectors 3121 for adapter 3120, electrical battery pack connectors 3131 for adapter 3130, and electrical battery pack connectors 3141 for adapter 3140), the battery pack receptacle/adapter 2910 electrical connections 2911 remain the same for each adapter. In one embodiment, the bottom portion of each adapter 3110, 3120, 3130, and 3140 includes electrical contacts 3311 (FIG. 33) for electrically connecting the adapters 3110, 3120, 3130, and 3140 with the electrical connectors 2911 of the battery pack receptacle/adapter 2910.

Figure 24:
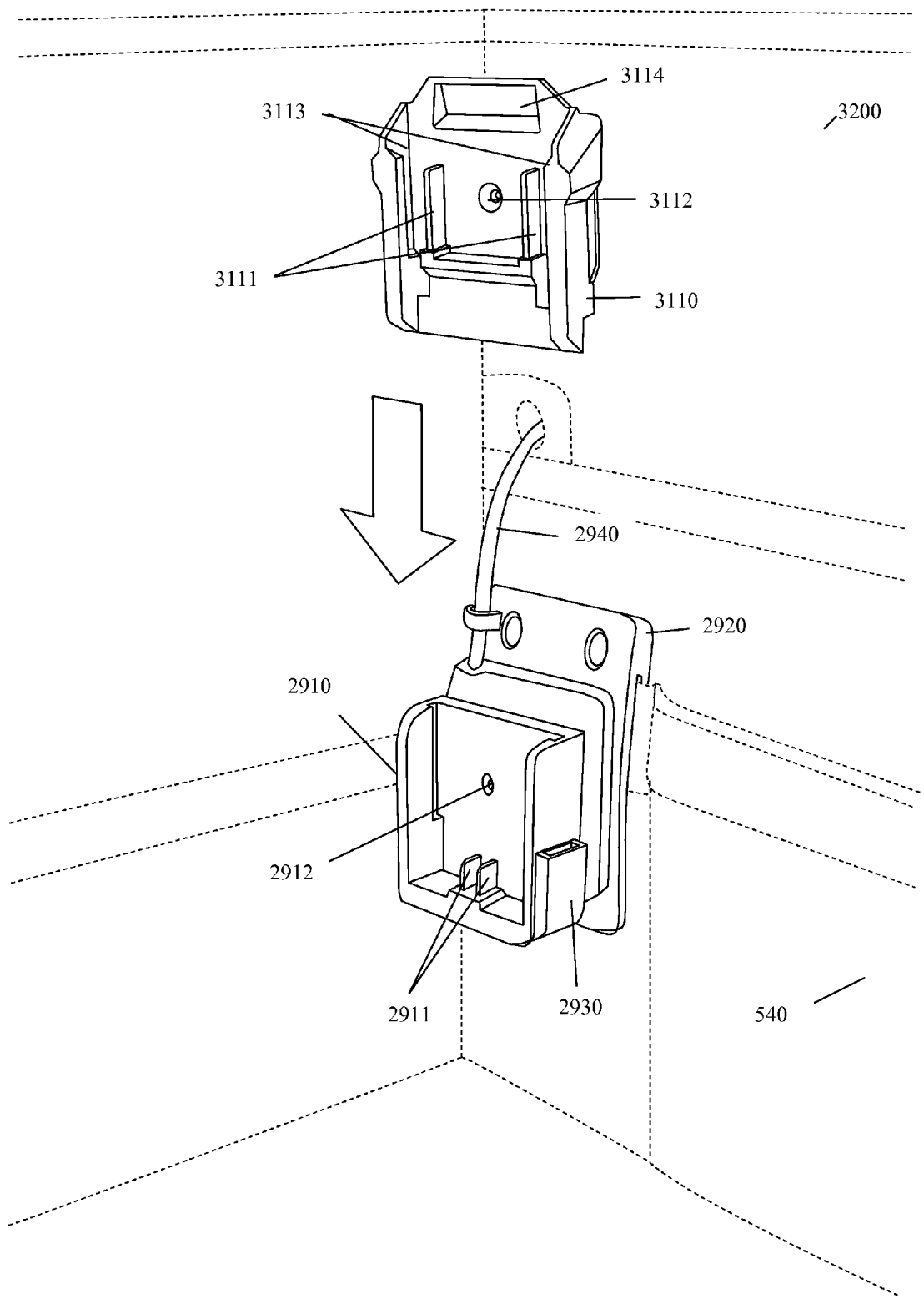
FIG. 24 illustrates a perspective view of the receptacle/adapter for a battery pack configured for accepting different multiple battery pack adapters showing an example implementation with a utility bag or other device and showing an example battery pack adapter to be inserted into the receptacle/adapter according to one embodiment.

FIG. 24 illustrates a perspective view 3200 of the battery pack receptacle/adapter 2910 for a battery pack configured for accepting multiple battery pack adapters (e.g., adapters 3110, 3120, 3130, and 3140) showing an example implementation with a utility bag 540 (or other device, bag apparatus, housing, platform, etc.) and showing an example battery pack adapter 3110 to be inserted into the battery pack receptacle/adapter 2910 in the direction of the arrow according to one embodiment. In one embodiment, the adapter 3110 is moved in the direction of the arrow so that the guide elements/portions 3313 are slid/placed into the retaining channels or grooves 2913, which aligns the adapter 3110 with the battery pack receptacle/adapter 2910 so that the electrical contacts 3311 align properly with the battery pack adapter electrical connectors 2911 for the circuitry continuity.

Figure 25:
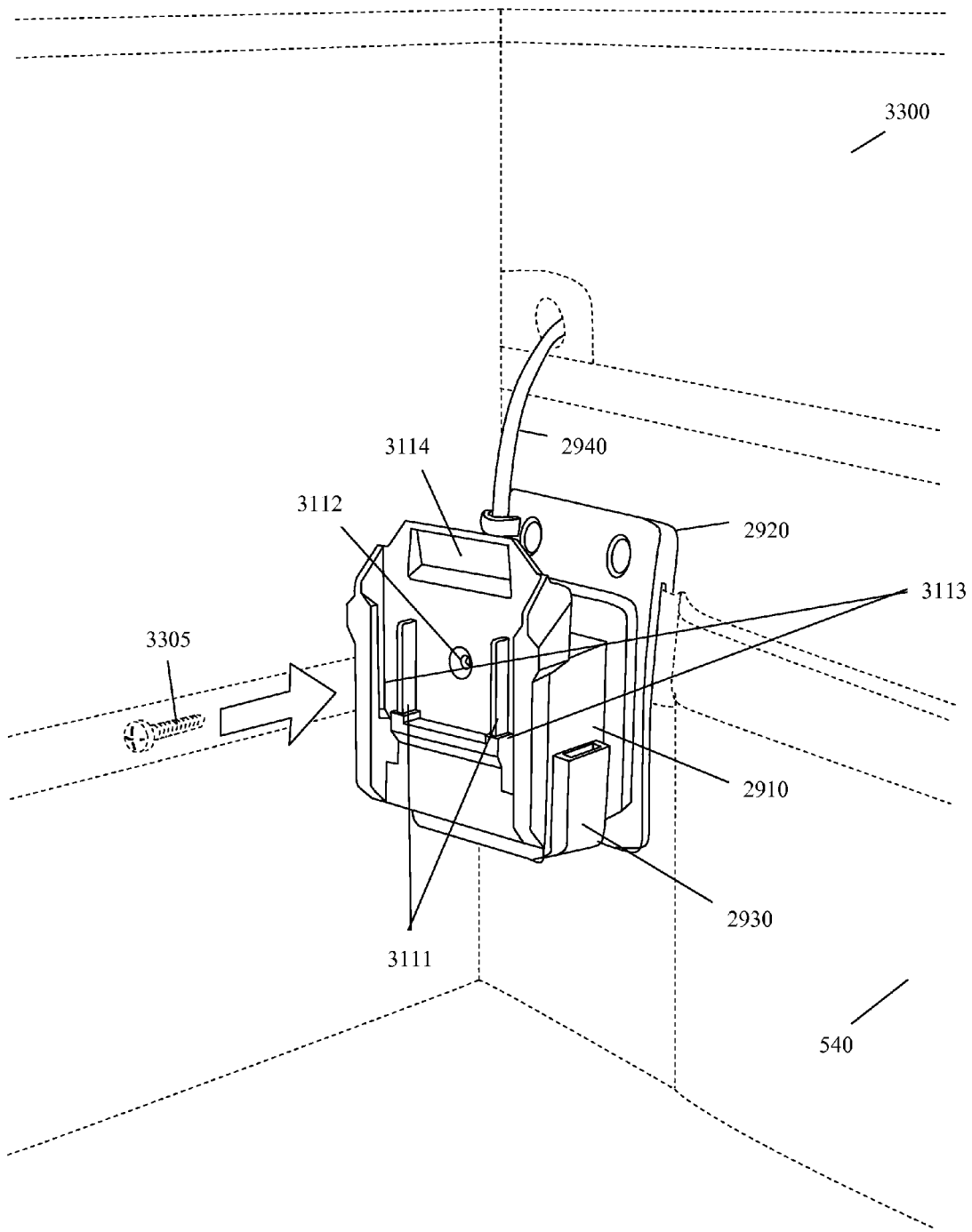
FIG. 25 illustrates a perspective view of the receptacle/adapter for a battery pack configured for accepting different multiple battery pack adapters showing an example implementation with a utility bag or other device and showing an example battery pack adapter inserted into the receptacle/adapter according to one embodiment.

FIG. 25 illustrates a perspective view 3300 of the battery pack receptacle/adapter 2910 for a cordless device battery pack configured for accepting multiple battery pack adapters (e.g., adapters 3110, 3120, 3130, and 3140) showing an example implementation with a utility bag 540 (or other device, bag apparatus, housing, platform, etc.) and showing the example battery pack adapter 3110 inserted into the battery pack receptacle/adapter 2910 according to one embodiment. In one example, the fastener 3305 may be inserted in the direction of the arrow through the through-hole 3112 for fastening the adapter 3110 to the battery pack receptacle/adapter 2910 (e.g., when a user is only using or planning on using a single adapter for a particular brand of battery pack, to prevent dislodgement, etc.).

Figure 26:
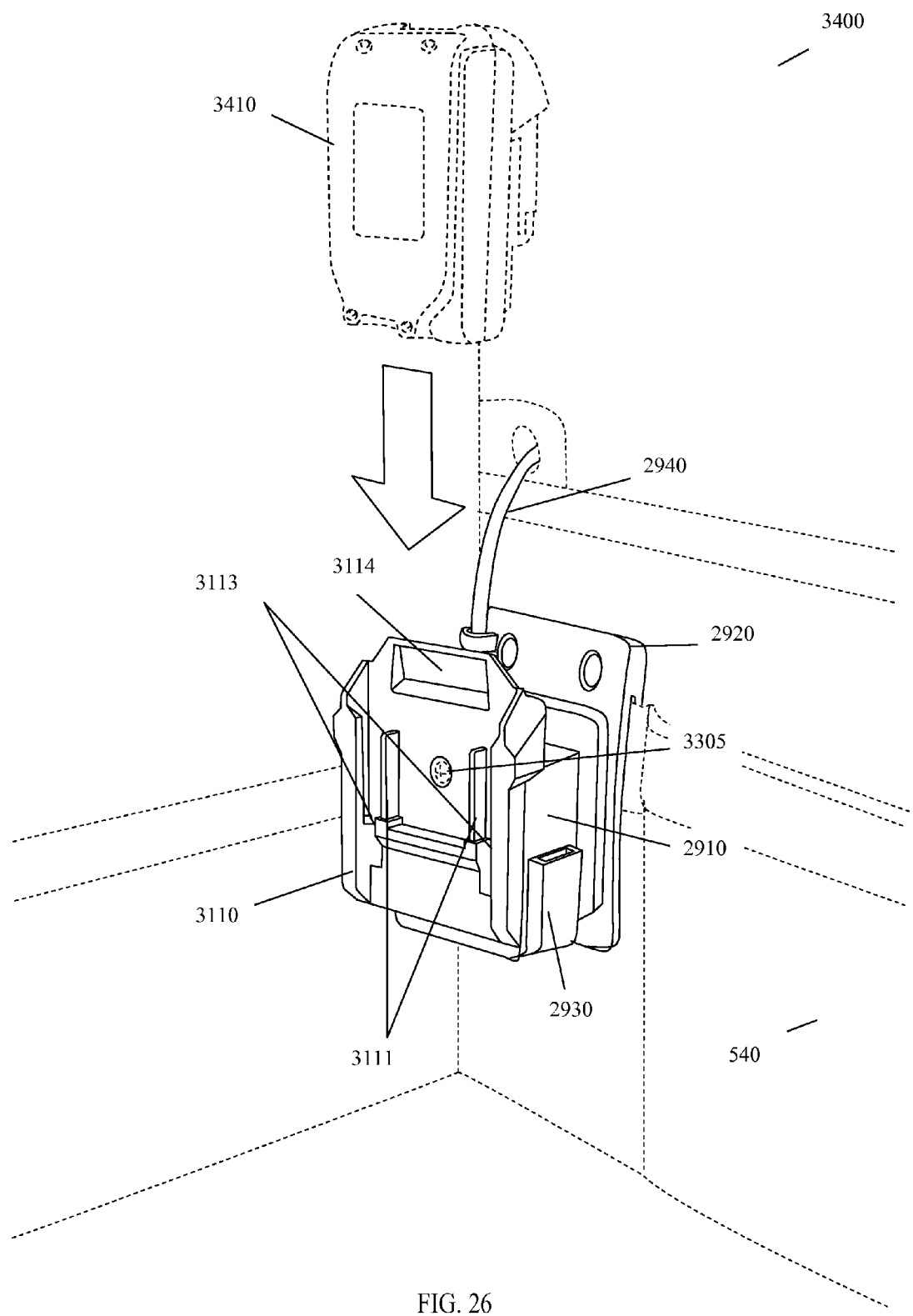
FIG. 26 illustrates a perspective view of the receptacle/adapter shown in FIG. 25 showing an example implementation with an example battery pack being inserted into the example battery pack adapter according to one embodiment.

FIG. 26 illustrates a perspective view 3400 of the battery pack receptacle/adapter 2910 showing an example implementation with an example battery pack 3410 being inserted into the example battery pack adapter 3110 in the direction of the arrow according to one embodiment. In one embodiment, the battery pack 3410 is inserted/slid into the adapter 3110 so that the electrical contact portions of the battery pack 3410 is guided into contact with the electrical connections 3111 by aligning the rear portion of the battery pack 3410 within the retaining portions 3113.

Figure 27:
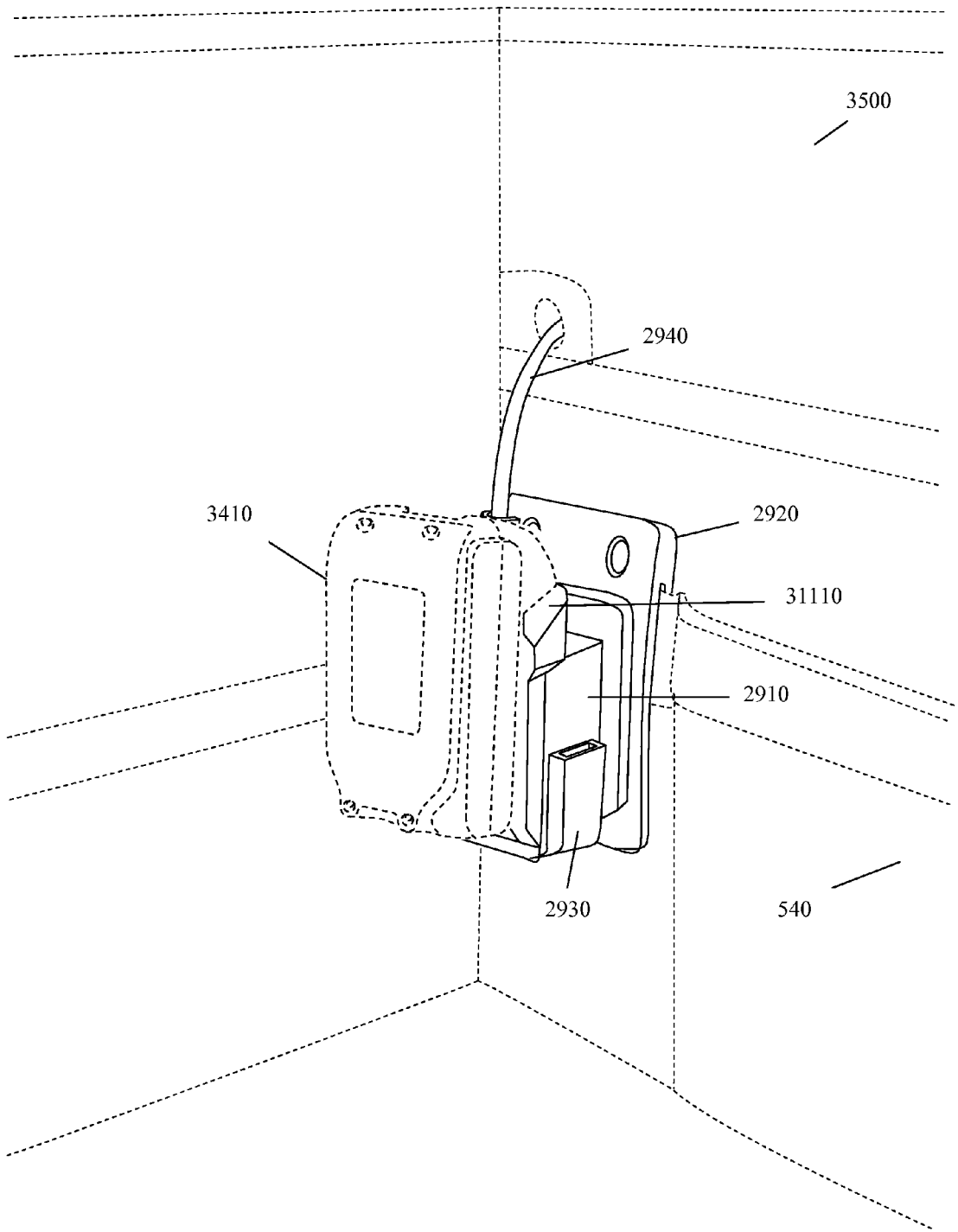
FIG. 27 illustrates a perspective view of the receptacle/adapter shown in FIG. 26 showing the example battery pack inserted into the example battery pack adapter according to one embodiment.

FIG. 27 illustrates a perspective view 3500 of the battery pack receptacle/adapter 2910 showing the example battery pack 3410 inserted into the example battery pack adapter 3110 that is connected with the battery pack receptacle/adapter 2910, according to one embodiment. In one embodiment, the battery pack receptacle/adapter 2910 begins to receive the voltage or power from the battery pack 3410 upon insertion into the adapter 3110 that is connected to the battery pack receptacle/adapter 2910. In another embodiment, the battery pack receptacle/adapter 2910 or the adapter 3110 includes a switch to either electrically connect or disconnect the battery pack 3410 from the battery pack receptacle/adapter 2910. In one embodiment, when the battery pack 3410 is supplying power to the battery pack receptacle/adapter 2910, an indicator light (e.g., an LED) is illuminated as an indication.

Figure 28:
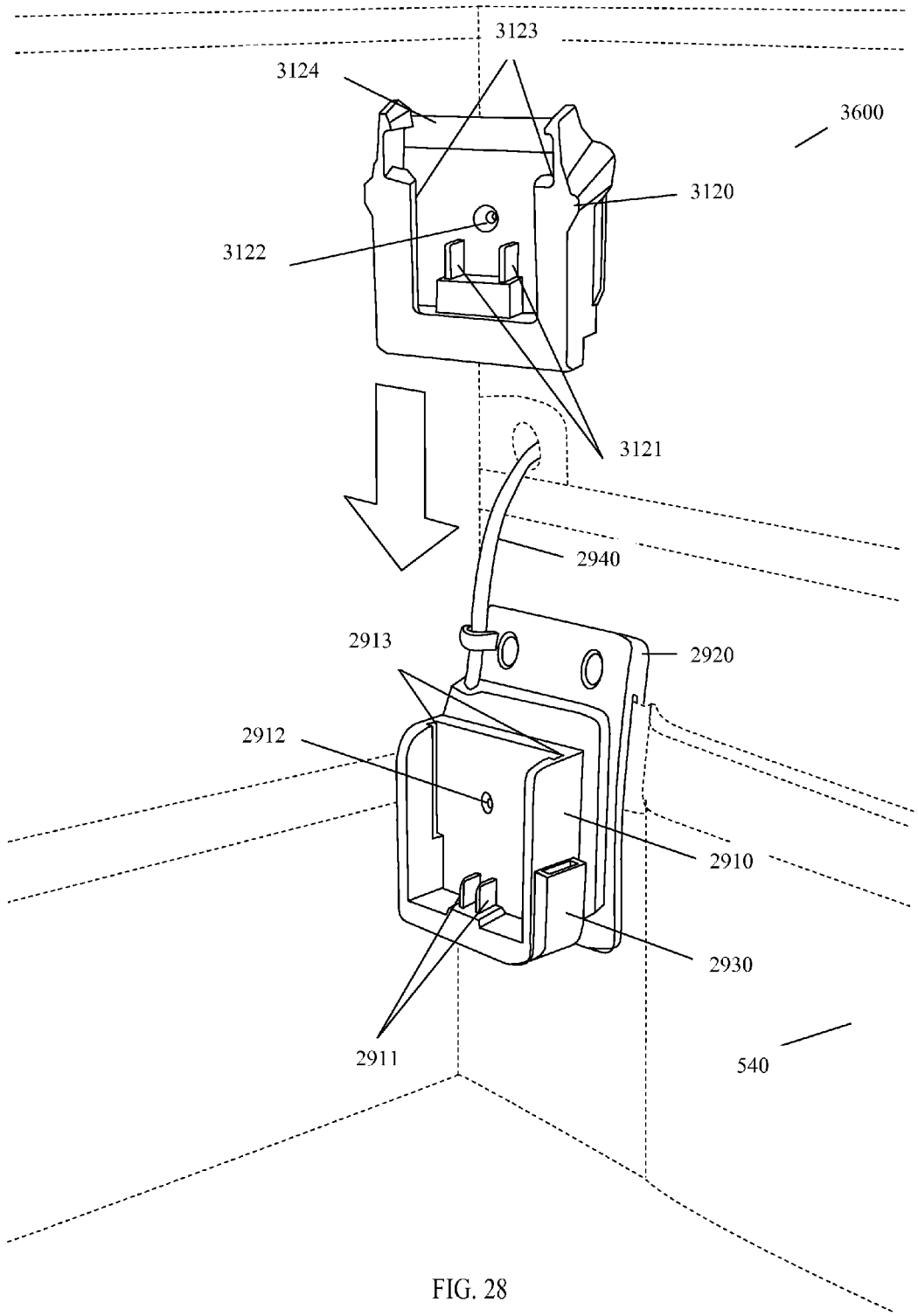
FIG. 28 illustrates a perspective view of the receptacle/adapter for a battery pack configured for accepting different multiple battery pack adapters showing an example implementation with a utility bag and showing another example battery pack adapter to be inserted into the receptacle/adapter according to one embodiment.

FIG. 28 illustrates a perspective view 3600 of the battery pack receptacle/adapter 2910 for a battery pack configured for accepting multiple battery pack adapters (e.g., adapters 3110, 3120, 3130, and 3140) showing an example implementation with a utility bag 540 (or other device, bag apparatus, housing, platform, etc.) and showing an example battery pack adapter 3120 to be inserted into the battery pack receptacle/adapter 2910 in the direction of the arrow according to one embodiment. In one embodiment, the adapter 3120 is moved in the direction of the arrow so that the guide portions 3313 are slid/placed into the retaining channels or grooves 2913, which aligns the adapter 3120 with the battery pack receptacle/adapter 2910 so that the electrical contacts 3311 align properly with the battery pack adapter electrical connectors 2911 for the circuitry continuity.

Figure 29:
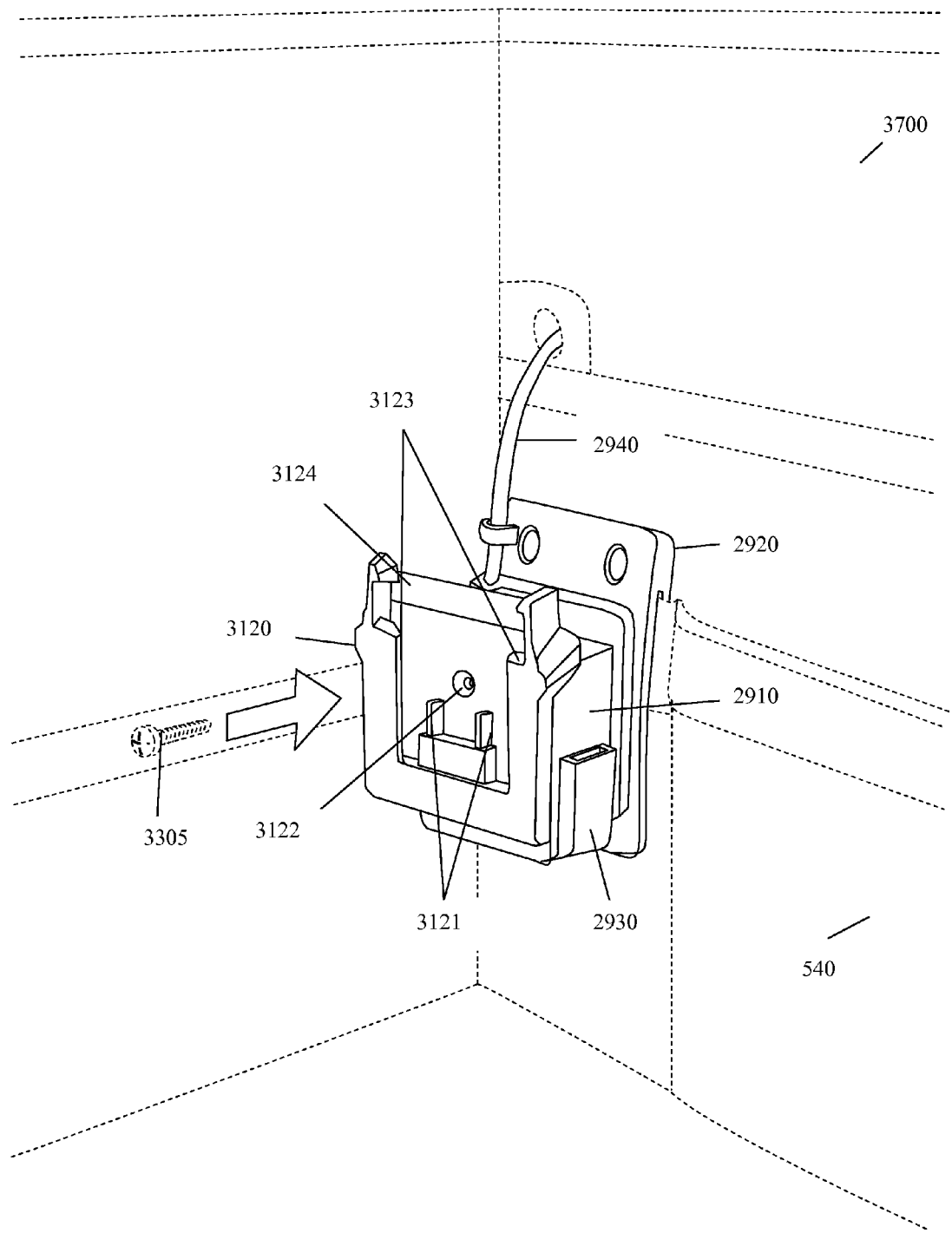
FIG. 29 illustrates a perspective view of the receptacle/adapter for a battery pack configured for accepting different multiple battery pack adapters showing the example battery pack adapter inserted into the receptacle/adapter according to one embodiment.

FIG. 29 illustrates a perspective view 3700 of the battery pack receptacle/adapter 2910 for a cordless device battery pack configured for accepting multiple battery pack adapters (e.g., adapters 3110, 3120, 3130, and 3140) showing an example implementation with a utility bag 540 (or other device, bag apparatus, housing, platform, etc.) and showing the example battery pack adapter 3120 inserted into the battery pack receptacle/adapter 2910 according to one embodiment. In one example, the fastener 3305 may be inserted in the direction of the arrow through the through-hole 3122 for fastening the adapter 3120 to the battery pack receptacle/adapter 2910 (e.g., when a user is only using or planning on using a single adapter for a particular brand of battery pack, to prevent dislodgement, etc.).

Figure 30:
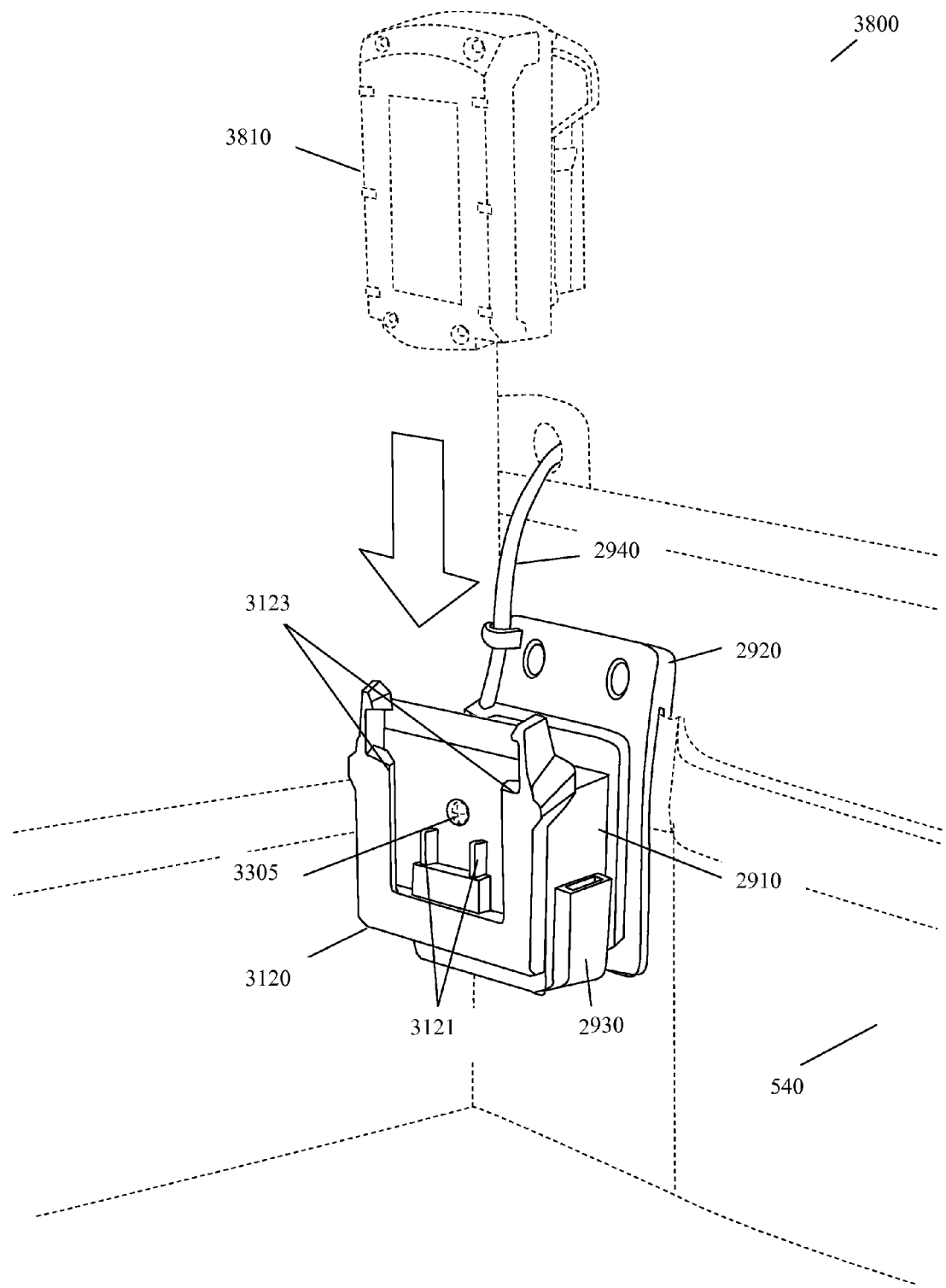
FIG. 30 illustrates a perspective view of the receptacle/adapter shown in FIG. 29 showing an example battery pack being inserted into the example battery pack adapter according to one embodiment.

FIG. 30 illustrates a perspective view 3800 of the battery pack receptacle/adapter 2910 showing an example implementation with an example battery pack 3810 (for an associated brand of cordless tools) being inserted into the example battery pack adapter 3120 (configured to electrically connect with the battery pack 3810) in the direction of the arrow according to one embodiment. In one embodiment, the battery pack 3810 is inserted/slid into the adapter 3120 so that the electrical contact portions of the battery pack 3810 is guided into contact with the electrical connections 3121 by aligning the rear portion of the battery pack 3810 within the retaining portions 3123.

Figure 31:
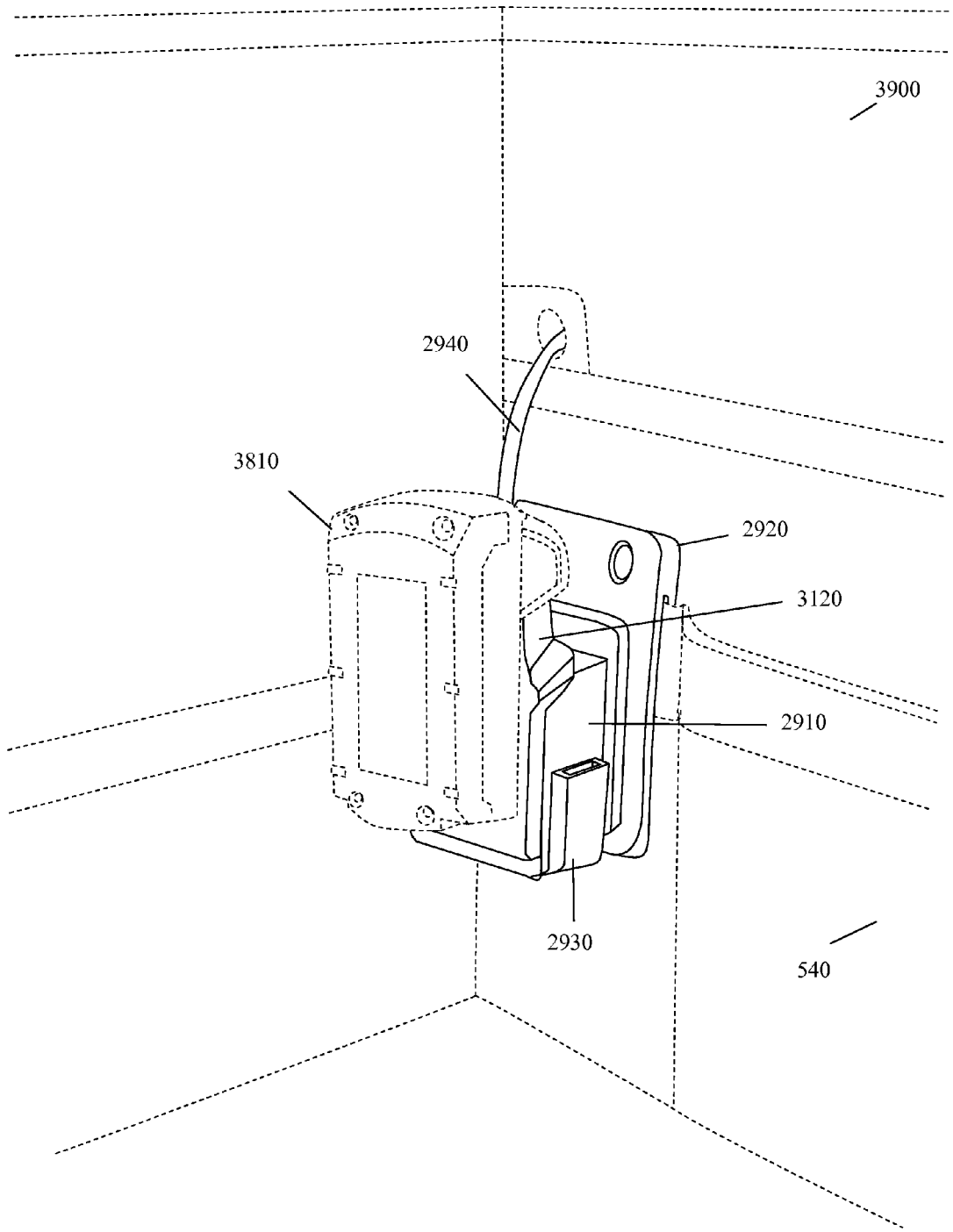
FIG. 31 illustrates a perspective view of the receptacle/adapter shown in FIG. 29 showing an example battery pack inserted into the example battery pack adapter according to one embodiment.

FIG. 31 illustrates a perspective view 3900 of the battery pack receptacle/adapter 2910 showing the example battery pack 3810 inserted into the example battery pack adapter 3120 that is connected with the battery pack receptacle/adapter 2910, according to one embodiment. In one embodiment, the battery pack receptacle/adapter 2910 begins to receive the voltage or power from the battery pack 3810 upon insertion into the adapter 3120 that is connected to the battery pack receptacle/adapter 2910. In another embodiment, the battery pack receptacle/adapter 2910 or the adapter 3120 includes a switch to either electrically connect or disconnect the battery pack 3810 from the battery pack receptacle/adapter 2910. In one embodiment, when the battery pack 3810 is supplying power to the battery pack receptacle/adapter 2910, an indicator light (e.g., an LED) is illuminated as an indication.

Figure 32:
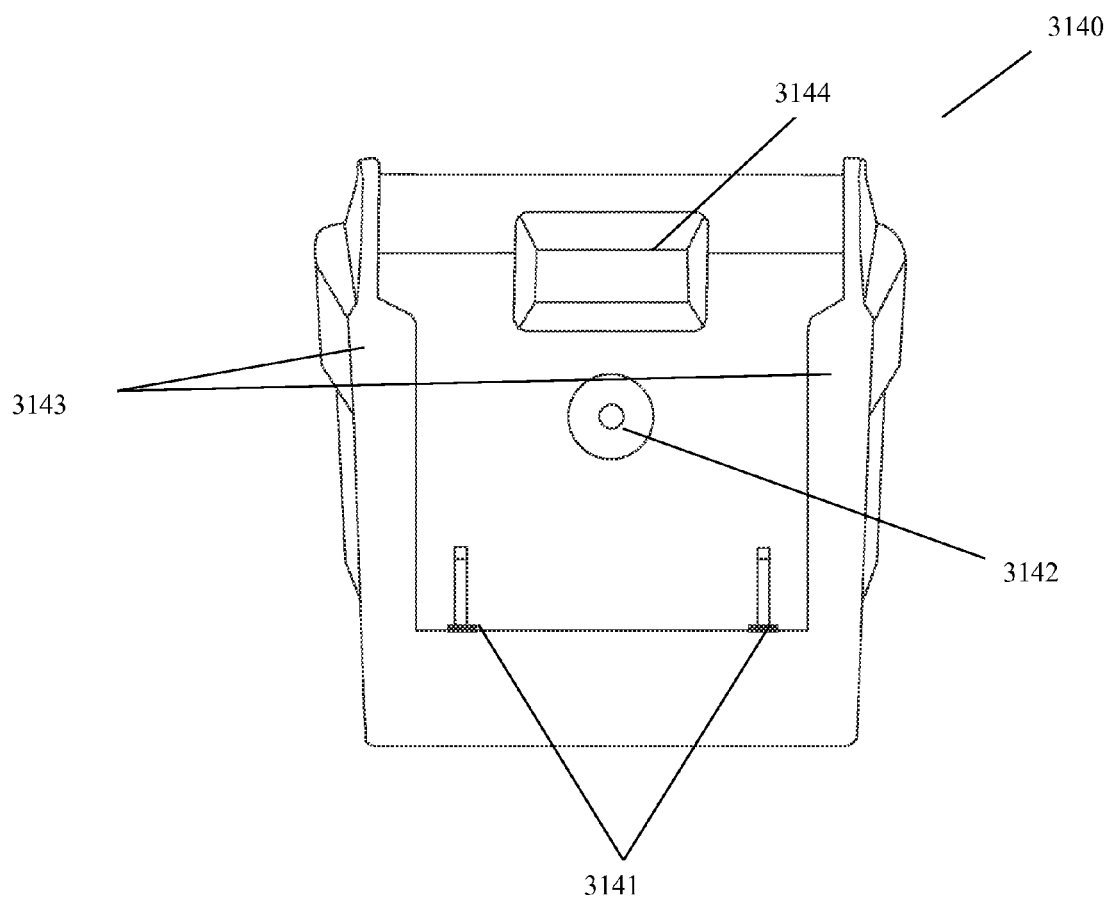
FIG. 32 illustrates a front view of an example battery pack adapter that is removably connected to a battery pack receptacle/adapter according to one embodiment.

FIG. 32 illustrates a front view of an example battery pack adapter 3140 that is removably connected to a battery pack receptacle/adapter 2910 (FIG. 21) according to one embodiment. As shown, the retaining portions 3143 include left and right extensions that retain a battery pack for a cordless tool. The retaining portions 3143 also align the battery pack's electrical contacts with the electrical contacts 3141 for providing continuity from the battery pack to the adapter 3140.

Figure 33:
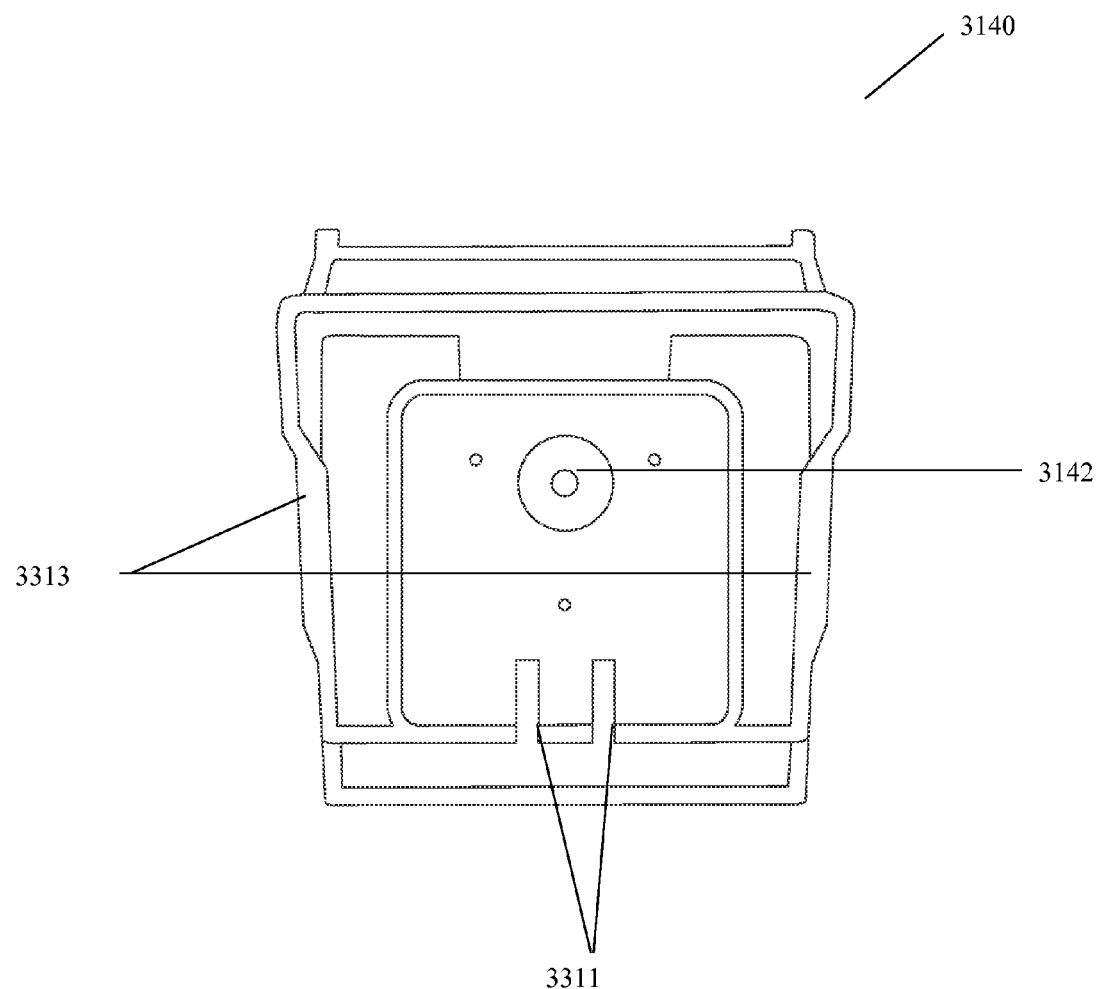
FIG. 33 illustrates a rear view of the example battery pack adapter shown in FIG. 32 that is removably connected to a battery pack receptacle/adapter according to one embodiment.

FIG. 33 illustrates a rear view of the example battery pack adapter 3140 shown in FIG. 32 that is removably connected to the battery pack receptacle/adapter 2910 (FIG. 21) according to one embodiment. As shown, the guide portions 3313 are configured for fitment within the retaining channels or grooves 2913 and are tapered towards the bottom of the battery pack receptacle/adapter 2910. In one embodiment, the contacts 3311 are female connectors that receive the electrical connectors 2911, which are configured as male connectors. In another embodiment, the contacts 3311 and electrical connectors 2911 may be reversed such that the electrical connectors are female and the contacts 3311 are male.

Figure 34:
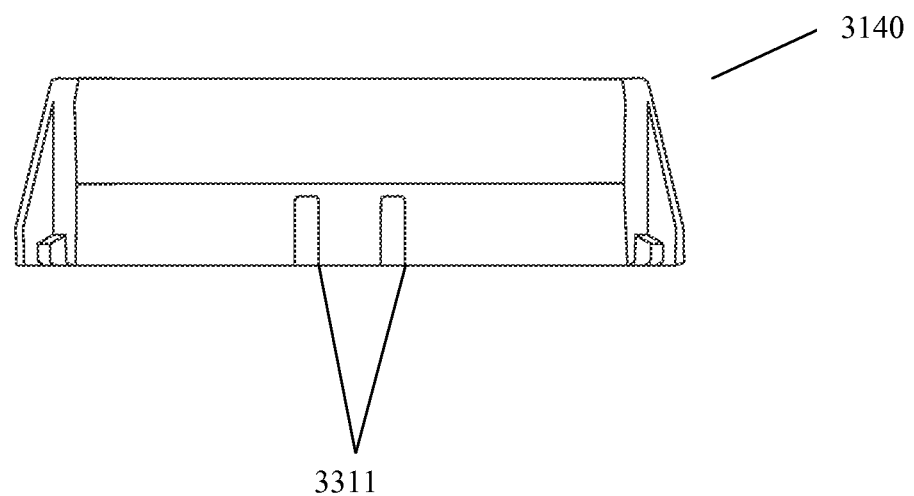
FIG. 34 illustrates a bottom view of the example battery pack adapter shown in FIG. 32 that is removably connected to a battery pack receptacle/adapter according to one embodiment.

FIG. 34 illustrates a bottom view of the example battery pack adapter 3140 that is removably connected to the battery pack receptacle/adapter 2910 (FIG. 21) according to one embodiment. As shown, the contacts 3311 are located on the bottom of the adapter 3140 and are positioned for alignment with the electrical connectors 2911 when the adapter 3140 is inserted into the battery pack receptacle/adapter 2910.

One or more embodiments are not limited to four manufacturer or brands of cordless device battery packs for using the adapters 3110, 3120, 3130 and 3140 to transfer power from the cordless device battery packs to a USB connector/port. Other adapters (not shown) for any other manufacturers or brand of cordless device battery packs may be implemented by embodiments in order to provide for conversion of cordless device battery pack power to USB delivered power or voltage. In one or more embodiments, a user that may need to power or charge a USB device may use a cordless device battery pack to do so when it may not be possible or is inconvenient to power or charge a USB device depending on the circumstances (e.g., no electricity, distance from a connection, forgot to bring a USB cord or charger for a USB device, etc.).

In the description above, numerous specific details are set forth. However, it is understood that embodiments of the invention may be practiced without these specific details. For example, well-known equivalent components and elements may be substituted in place of those described herein, and similarly, well-known equivalent techniques may be substituted in place of the particular techniques disclosed. In other instances, well-known structures and techniques have not been shown in detail to avoid obscuring the understanding of this description.

In the description above, numerous specific details are set forth. However, it is understood that embodiments may be practiced without these specific details. For example, well-known equivalent components and elements may be substituted in place of those described herein, and similarly, well-known equivalent techniques may be substituted in place of the particular techniques disclosed. In other instances, well-known structures and techniques have not been shown in detail to avoid obscuring the understanding of this description.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. An apparatus comprising:
   a battery pack receptacle that removably couples to one of multiple adapters for an associated battery pack used for a cordless device;
   a universal serial bus (USB) port that is coupled to the battery pack receptacle, wherein the battery pack is used as a power source for the USB port.

2. The apparatus of claim 1, further comprising an attachment device coupled to the battery pack receptacle that attaches the battery pack receptacle to a device comprising one of a utility bag, a housing, and a platform.

3. The apparatus of claim 1, further comprising a USB cord coupled to a first USB receptacle.

4. The apparatus of claim 1, further comprising a second USB receptacle coupled to the battery pack receptacle.

5. The apparatus of claim 1, wherein the multiple adapters are each associated with a different battery pack for different brands of cordless devices.

6. The apparatus of claim 1, wherein each of the multiple adapters is configured with a different electrical contact configuration from one another for electrically connecting to a particular type of battery pack.

7. The apparatus of claim 6, wherein each of the multiple adapters is configured with a same electrical contact configuration for electrically connecting to the battery pack receptacle.

8. The apparatus of claim 7, wherein each of the multiple adapters include guide elements for positioning within retaining channels of the battery pack receptacle.

9. The apparatus of claim 7, wherein each of the multiple adapters includes a through-hole for coupling to the battery pack receptacle with a fastener.

10. The apparatus of claim 2, wherein the utility bag comprises one of: a sporting bag, a fishing bag, a luggage container, a backpack, a duffle bag, a tool bag, emergency services bag, a cooler, and a camping bag.

11. A system comprising:
    a utility bag;
    a battery pack receptacle;
    a plurality of battery pack adapters that are each configured for coupling to the battery pack receptacle, wherein each of the plurality of battery pack adapters is configured for removably coupling with a particular type of battery pack used for a cordless device;
    an attachment device coupled to the battery pack receptacle that attaches the battery pack receptacle to the utility bag; and
    at least one universal serial bus (USB) port coupled to the battery pack receptacle, wherein the battery pack receptacle transfers power from a received particular battery pack through a particular one of the plurality of battery pack adapters and to the USB port.

12. The system of claim 11, further comprising a cord coupled to the at least one USB port.

13. The system of claim 12, further comprising a second USB receptacle coupled to the battery pack receptacle.

14. The system of claim 12, wherein each adapter of the plurality of adapters is associated with a different battery pack for different brands of cordless devices.

15. The system of claim 14, wherein each adapter of the plurality of adapters is configured with a different electrical contact configuration from one another for electrically connecting to a particular type of battery pack.

16. The system of claim 15, wherein each adapter of the plurality of adapters is configured with a same electrical contact configuration for electrically connecting to the battery pack receptacle.

17. The system of claim 16, wherein each adapter of the plurality of adapters include guide elements for positioning within retaining channels of the battery pack receptacle.

18. The system of claim 16, wherein each adapter of the plurality of adapters includes a through-hole for coupling to the battery pack receptacle with a fastener.

19. The system of claim 11, wherein the utility bag comprises one of: a sporting bag, a fishing bag, a luggage container, a backpack, a duffle bag, a tool bag, emergency services bag, a cooler, and a camping bag.

20. A system comprising:
    a plurality of cordless device battery pack adapters; and
    a battery pack receptacle that removably couples to one of the plurality of cordless device battery pack adapters for a particular cordless device battery pack, the battery pack receptacle comprising a universal serial bus (USB) port;
    wherein:
    each cordless device battery pack adapter of the plurality of cordless device battery pack adapters is configured with a different electrical contact configuration from one another for electrically connecting to a particular type of cordless device battery pack;
    each cordless device battery pack adapter of the plurality of cordless device battery pack adapters is configured with a same electrical contact configuration for electrically connecting to the battery pack receptacle; and
    the USB port is powered by a battery pack connected with a particular one of the plurality of cordless device battery pack adapters that is coupled to the battery pack receptacle.

* * * * *